(12) United States Patent
Marquardt et al.

(10) Patent No.: US 11,604,782 B2
(45) Date of Patent: *Mar. 14, 2023

(54) SYSTEMS AND METHODS FOR SCHEDULING CONCURRENT SUMMARIZATION OF INDEXED DATA

(71) Applicant: SPLUNK INC., San Francisco, CA (US)

(72) Inventors: David Marquardt, San Francisco, CA (US); Xiaowei Wang, Belmont, CA (US)

(73) Assignee: SPLUNK, INC., San Francisco, CA (US)

( * ) Notice: Subject to any disclaimer, the term of this patent is extended or adjusted under 35 U.S.C. 154(b) by 399 days.

This patent is subject to a terminal disclaimer.

(21) Appl. No.: 16/298,925

(22) Filed: Mar. 11, 2019

(65) Prior Publication Data

US 2019/0205293 A1 Jul. 4, 2019

Related U.S. Application Data

(63) Continuation of application No. 14/694,797, filed on Apr. 23, 2015, now Pat. No. 10,229,150.

(51) Int. Cl.
*G06F 16/23* (2019.01)
*G06F 16/13* (2019.01)
*G06F 16/22* (2019.01)
*G06F 16/245* (2019.01)

(52) U.S. Cl.
CPC .......... *G06F 16/2343* (2019.01); *G06F 16/13* (2019.01); *G06F 16/2228* (2019.01); *G06F 16/2365* (2019.01); *G06F 16/245* (2019.01)

(58) Field of Classification Search
CPC .... G06F 16/2343; G06F 16/13; G06F 16/245; G06F 16/2228; G06F 16/2365
See application file for complete search history.

(56) References Cited

U.S. PATENT DOCUMENTS

| 5,550,971 | A | 8/1996 | Brunner et al. |
| 5,832,484 | A * | 11/1998 | Sankaran ............ G06F 16/2343 |
| 6,836,894 | B1 | 12/2004 | Hellerstein et al. |
| 6,907,422 | B1 | 6/2005 | Predovic |
| 7,523,191 | B1 * | 4/2009 | Thomas .............. G06F 11/3438 |
| | | | 709/202 |
| 7,581,019 | B1 | 8/2009 | Amir et al. |
| 7,774,469 | B2 * | 8/2010 | Massa ................. G06F 11/2035 |
| | | | 709/226 |
| 7,860,822 | B1 * | 12/2010 | Weinberger ........... G06F 16/283 |
| | | | 707/600 |

(Continued)

OTHER PUBLICATIONS

"General Purpose Database Summarization"; Aug. 30, 2005, VLDB Endowment.

(Continued)

*Primary Examiner* — Dennis Truong
(74) *Attorney, Agent, or Firm* — Artegis Law Group, LLP

(57) ABSTRACT

Provided are systems and methods for concurrent summarization of indexed data. In some embodiments, two or more summary processes can be executed concurrently (e.g., in parallel) by an indexer to generate summaries for respective subsets of indexed data (e.g., partitions or buckets of indexed data) managed by the indexer.

28 Claims, 16 Drawing Sheets

(56) References Cited

U.S. PATENT DOCUMENTS

| | | | |
|---|---|---|---|
| 8,271,440 B2* | 9/2012 | Matsuzawa | G06F 16/2379 707/625 |
| 8,516,008 B1* | 8/2013 | Marquardt | G06F 16/2322 707/802 |
| 8,560,511 B1* | 10/2013 | Matthews | H04L 43/16 707/704 |
| 8,682,886 B2* | 3/2014 | Sorkin | G06F 16/2228 707/715 |
| 8,682,925 B1* | 3/2014 | Marquardt | G06F 16/2455 707/770 |
| 8,805,737 B1* | 8/2014 | Chen | G06Q 40/02 705/38 |
| 8,898,713 B1* | 11/2014 | Price | G06F 16/7867 725/94 |
| 9,128,985 B2 | 9/2015 | Marquardt et al. | |
| 9,437,022 B2 | 9/2016 | Vander Broek | |
| 9,753,974 B2 | 9/2017 | Marquardt et al. | |
| 9,842,160 B2 | 12/2017 | Robichaud | |
| 9,977,803 B2 | 5/2018 | Robichaud et al. | |
| 10,565,005 B2* | 2/2020 | Stanfill | G06F 9/4881 |
| 2001/0042090 A1* | 11/2001 | Williams | G06F 9/4881 718/102 |
| 2002/0046273 A1* | 4/2002 | Lahr | H04L 43/18 709/224 |
| 2002/0054101 A1 | 5/2002 | Beatty | |
| 2002/0065976 A1* | 5/2002 | Kahn | G06Q 10/10 711/1 |
| 2002/0087743 A1* | 7/2002 | Givoly | G06F 16/20 719/330 |
| 2002/0188600 A1 | 12/2002 | Lindsay et al. | |
| 2003/0014399 A1 | 1/2003 | Hansen et al. | |
| 2004/0078359 A1 | 4/2004 | Bolognese et al. | |
| 2004/0221226 A1 | 11/2004 | Lin et al. | |
| 2004/0225641 A1 | 11/2004 | Dettinger et al. | |
| 2004/0254919 A1 | 12/2004 | Giuseppini | |
| 2005/0071320 A1* | 3/2005 | Chkodrov | G06F 16/24565 |
| 2005/0097556 A1* | 5/2005 | Code | G06F 9/4881 718/102 |
| 2005/0125325 A1* | 6/2005 | Chai | G06F 16/24539 705/35 |
| 2005/0203876 A1 | 9/2005 | Cragun et al. | |
| 2006/0059238 A1* | 3/2006 | Slater | H04L 51/12 709/206 |
| 2006/0074621 A1 | 4/2006 | Rachman | |
| 2006/0242189 A1 | 10/2006 | Leetaru et al. | |
| 2006/0253423 A1* | 11/2006 | McLane | G06F 16/951 |
| 2007/0073743 A1 | 3/2007 | Bammi et al. | |
| 2007/0209080 A1 | 9/2007 | Ture et al. | |
| 2007/0214164 A1 | 9/2007 | MacLennan et al. | |
| 2008/0059420 A1 | 3/2008 | Hsu et al. | |
| 2008/0104542 A1 | 5/2008 | Cohen et al. | |
| 2008/0228743 A1 | 9/2008 | Kusnitz et al. | |
| 2009/0055370 A1 | 2/2009 | Dagum et al. | |
| 2009/0063524 A1 | 3/2009 | Adler et al. | |
| 2009/0070786 A1* | 3/2009 | Alves | G06F 9/541 719/318 |
| 2009/0192983 A1 | 7/2009 | Elango | |
| 2009/0193406 A1 | 7/2009 | Williams | |
| 2009/0204588 A1 | 8/2009 | Hosono et al. | |
| 2009/0228528 A1 | 9/2009 | Ercegovac et al. | |
| 2009/0248691 A1* | 10/2009 | Vermette | G06F 16/00 |
| 2009/0300065 A1 | 12/2009 | Birchall | |
| 2009/0319512 A1 | 12/2009 | Baker et al. | |
| 2010/0005080 A1* | 1/2010 | Pike | G06F 11/1482 707/E17.002 |
| 2010/0074153 A1* | 3/2010 | Torsner | H04L 1/1621 370/280 |
| 2010/0095018 A1 | 4/2010 | Khemani et al. | |
| 2010/0125645 A1* | 5/2010 | Hady | H04L 67/06 709/217 |
| 2010/0228724 A1 | 9/2010 | Petri et al. | |
| 2010/0251100 A1 | 9/2010 | Delacourt | |
| 2010/0306281 A1 | 12/2010 | Williamson | |
| 2011/0016123 A1* | 1/2011 | Pandey | G06F 16/2308 707/737 |
| 2011/0040733 A1 | 2/2011 | Sercinoglu et al. | |
| 2011/0040745 A1 | 2/2011 | Zaydman et al. | |
| 2011/0191373 A1 | 8/2011 | Botros et al. | |
| 2011/0225143 A1 | 9/2011 | Khosravy et al. | |
| 2011/0302151 A1 | 12/2011 | Abadi et al. | |
| 2012/0008414 A1 | 1/2012 | Katz et al. | |
| 2012/0042319 A1* | 2/2012 | Hildrum | G06F 9/5038 718/104 |
| 2012/0079363 A1 | 3/2012 | Foiling et al. | |
| 2012/0117116 A1 | 5/2012 | Jacobson et al. | |
| 2012/0197914 A1 | 8/2012 | Harnett et al. | |
| 2012/0203794 A1 | 8/2012 | Zhang et al. | |
| 2012/0278336 A1 | 11/2012 | Malik et al. | |
| 2012/0296889 A1 | 11/2012 | Davydok et al. | |
| 2013/0054642 A1* | 2/2013 | Morin | G06F 16/258 707/770 |
| 2013/0086092 A1 | 4/2013 | James et al. | |
| 2013/0173306 A1 | 7/2013 | Sasidhar | |
| 2013/0238631 A1 | 9/2013 | Carmel et al. | |
| 2013/0311438 A1 | 11/2013 | Marquardt et al. | |
| 2013/0311509 A1 | 11/2013 | Sorkin et al. | |
| 2014/0214888 A1 | 7/2014 | Marquardt et al. | |
| 2014/0344273 A1* | 11/2014 | Haines | G06F 16/35 707/737 |
| 2014/0351819 A1* | 11/2014 | Shah | G06F 9/4881 718/103 |
| 2015/0039651 A1 | 2/2015 | Kinsely et al. | |
| 2015/0154269 A1 | 6/2015 | Miller et al. | |
| 2015/0213631 A1 | 7/2015 | Vander Broek | |
| 2016/0004750 A1 | 1/2016 | Marquardt et al. | |
| 2016/0224532 A1 | 8/2016 | Miller et al. | |
| 2016/0224618 A1 | 8/2016 | Robichaud et al. | |
| 2016/0224626 A1 | 8/2016 | Robichaud et al. | |
| 2016/0224643 A1 | 8/2016 | Robichaud | |
| 2016/0299933 A1* | 10/2016 | Fillipi | G06F 16/24565 |
| 2016/0314163 A1 | 10/2016 | Marquardt et al. | |
| 2017/0032550 A1 | 2/2017 | Vander Broek | |
| 2017/0139964 A1 | 5/2017 | Marquardt et al. | |
| 2017/0139965 A1 | 5/2017 | Marquardt et al. | |
| 2017/0139996 A1 | 5/2017 | Marquardt et al. | |
| 2017/0140013 A1 | 5/2017 | Marquardt et al. | |
| 2018/0218037 A1 | 8/2018 | Marquardt et al. | |

OTHER PUBLICATIONS

Carasso, D., "Expluring Splunk: Search Processing Language (SPL) Primer and Cookbook," Splunk, Apr. 2012.

Christopher D. Manning, Introduction to Information Retrieval, Apr. 1, 2009, Cambridge University Press, Cambridge, England, Chapter 1, p. 1-18.

Final Office Action dated May 31, 2013 for U.S. Appl. No. 13/607,117, 13 Pages.

Final Office Action dated May 31, 2013 for U.S. Appl. No. 13/662,369, 13 Pages.

Non-Final Office Action dated Feb. 22, 2013 for U.S. Appl. No. 13/475,798, 8 Pages.

Non-Final Office Action dated Jan. 11, 2013 for U.S. Appl. No. 13/662,369, 13 Pages.

Non-Final Office Action dated Jan. 14, 2013 for U.S. Appl. No. 13/607,117, 13 Pages.

Non-Final Office Action dated Jan. 8, 2013 for U.S. Appl. No. 13/662,984, 7 Pages.

Non-Final Office Action dated May 16, 2013 for U.S. Appl. No. 13/756,147, 23 Pages.

Non-Final Office Action dated Sep. 12, 2013 for U.S. Appl. No. 13/607,117, 15 Pages.

Non-Final Office Action dated Sep. 12, 2013 for U.S. Appl. No. 13/662,369, 12 Pages.

Notice of Allowance dated Apr. 25, 2013 for U.S. Appl. No. 13/475,798, 13 Pages.

United States Patent and Trademark Office, U.S. Appl. No. 15/007,185, Non-Final Office Action dated May 6, 2016.

U.S. Appl. No. 14/170,159, Notice of Allowance dated May 8, 2015.

(56) References Cited

OTHER PUBLICATIONS

U.S. Appl. No. 14/815,973, Final Office Action dated Dec. 13, 2016.
U.S. Appl. No. 14/815,973, Non-Final Office Action dated Jun. 2, 2016.
United States Patent and Trademark Office, U.S. Appl. No. 15/007,185, Final Office Action dated Dec. 13, 2016.

* cited by examiner

```
Original Search: 1501
search "error" | stats count BY host

Sent to peers: 1502
search "error" | prestats count BY host(map)

Executed by search head: 1503
Merge prestats results received from peers (reduce)
```

SYSTEMS AND METHODS FOR SCHEDULING CONCURRENT SUMMARIZATION OF INDEXED DATA

CROSS-REFERENCE TO RELATED APPLICATIONS

This application is a continuation of U.S. patent application Ser. No. 14/694,797, Attorney Docket SPLK-0016-01.01US, filed Apr. 23, 2015, the entire disclosure of which is incorporated herein by reference.

TECHNICAL FIELD

The present disclosure is generally directed to data processing, and more particularly, to systems and methods for concurrent summarization of indexed data.

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

FIG. 9 illustrates an example search query received from a client and executed by search peers in accordance with the disclosed embodiments.

FIG. 10B illustrates an example data summary dialog that enables a user to select various data sources in accordance with the disclosed embodiments.

DETAILED DESCRIPTION

Figure 1A:
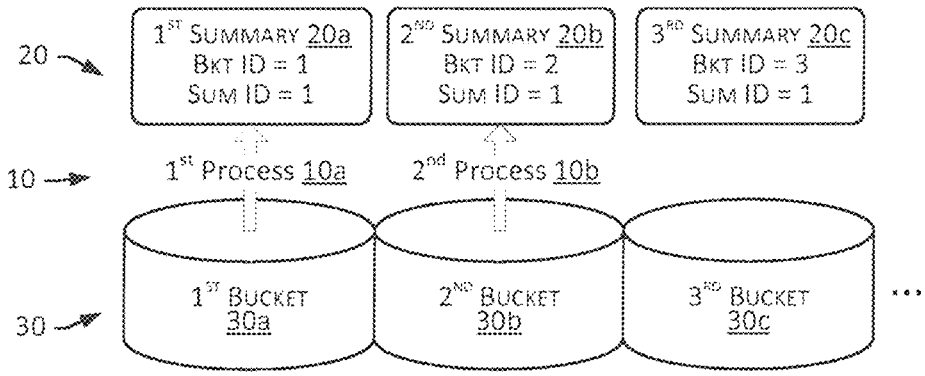
FIGS. 1A-1C are block diagrams that illustrates example summarization processes in accordance with the disclosed embodiments.

The present disclosure is directed to concurrent summarization of indexed data. In some embodiments, two or more summary processes can be executed concurrently (e.g., in parallel by an indexer) to generate summaries for respective subsets of indexed data (e.g., summaries of partitions or buckets of indexed data managed by the indexer). In some embodiments, a file (or directory) associated with a particular summary for a subset of data is locked when a process is writing summary data to it, thereby inhibiting other processes from writing conflicting or redundant summary data to the file (or directory) for the same subset of data. In response to determining that a file (or directory) associated with a particular summary for a subset of data is locked, a process may proceed to summarizing another subset of data for which the file (or directory) associated with the particular summary for the other subset of data is not locked. Such embodiments can enable multiple summarizations processes to execute in parallel to generate similar summaries for multiple subsets of data (e.g., similar summaries for partitions or buckets of indexed data) without creating conflicting or redundant summaries for the subsets of data.

As described herein, in some embodiments, an index includes partitions of indexed machine-generated data (also referred to as "buckets") that are managed by an indexer. For example, an indexer may receive machine-generated data (e.g., log data generated by an e-mail server), the data may be parsed into events, and the indexer may index and store the events in buckets managed by the indexer. The events may be time stamped (or otherwise associated with a time) and the indexer may index and store the events in certain buckets based on the time associated with the events. For example, the indexer may index and store the first 1000 events of the log data generated by the e-mail, server in a first bucket, index and store the second 1000 events of the log data generated by the e-mail server in a second bucket, and so forth. Thus, each of the buckets may store a subset of events of a similar age, or at least a subset of events associated with a given timespan (e.g., a timespan from the time associated with the earliest event in the bucket to the time associated with latest event in the bucket). Although certain embodiments are describe with regard to an indexers maintaining indexes of machine-data from an e-mail server for the purpose of illustration, an indexer can maintain any number of buckets of indexed machined data received from any variety of sources as described herein.

In some embodiments, a summary process can be executed to generate a summary of data in a bucket. For example, an indexer can execute a summary process to generate a summary (also referred to as a "bucket summary") that includes information indicating the average size of e-mails based the data contained in the events stored in a bucket (e.g., a subset of events generated by an e-mail server). In some embodiments, a summary can include a report summary that can be used, for example, to accelerate generation of reports concerning the summarized data. A report summary may include a pre-calculated statistic ("stat") (also referred to as a "pre-computed aggregate") that can be used in the generation of statistics (or aggregates) of a report on the summarized data, or a larger set of data. For example, in the context of events generated by an e-mail server, a bucket report summary may include a count of events in a bucket that include a value for a size field (e.g., 1000 events that include a "size" field) and a sum of the values for the size fields in those events (e.g., 1000 MB (megabytes) total, for the size values in the 1000 events). Such pre-computed values can be used, for example, to generate an average "size" e-mail for that bucket of data (e.g., an average e-mail size of 1 MB for the bucket). In some embodiments, a more complete report can be generated across a larger set of data, such as a large number of buckets managed by one or more indexers, using these types of report summaries. For example, an entity, such as a search head, may request these types of bucket report summaries from all of the indexers in a system, and combine the counts of events and the size values from all of the bucket report summaries to generate an average e-mail size indicated by the larger set of data (e.g., the average e-mail size from the events indicated by the events stored the buckets of the indexers). This process may be referred to as an accelerated reporting. With accelerated reporting, the speed of generating the overall report at the search head can be increased due to the fact that pre-generated bucket report summaries (e.g., bucket report summaries stored at the indexer) can be retrieved and used to generate the reports. Thus, generation of the overall report summary at the search head can avoid some or all of the processing overhead and time associated with generating the bucket level report summaries because that processing has already been completed by the indexers. Report acceleration and associated embodiments are described in more detail herein with regard to at least FIGS. 5-11D.

In some embodiments, a summary can include a data model summary that can be used, for example, to accelerate generation of generating reports on attributes (also referred to as "fields") of a data model. As described herein, a data model can include one or more "objects" (also referred, to as "data model objects") that define or otherwise correspond to a specific set of data. A data model object may be defined by: (1) a set of search constraints; and (2) a set of fields. Thus, a data model object can be used to quickly search data to identify a set of events (e.g., a set of events that satisfy the set of search constraints of the data model object) and a set of fields associated with the set of events (e.g., the set of fields of the data model object that are in the set of events identified). For example, an "e-mails processed" data model object may specify a search for events relating to e-mails that have been processed by a given e-mail server, and specify a set of fields (e.g., date, size, etc.) that are associated with the events. Thus, a user can retrieve and use the "e-mails processed" data model object to quickly retrieve a listing of the set of fields (e.g., date, size, etc.) of the events relating to e-mails processed by the given e-mail server. By using a data model, the user may not have to recreate the search and re-identify the fields of interest. Example embodiments of data models and example usage of data models is described in U.S. patent application Ser. No. 14/503,335 titled "Generating Reports from Unstructured Data" and filed on Sep. 30, 2014, which is hereby incorporated by reference in its entirety.

A data model summary for a data model can include or otherwise identify values the fields (or attributes) specified by the data model that are from the events that satisfy the search criteria of the data model. For example, if a data model objects specifies (1) search criteria of events from e-mail servers, and (2) attribute of "size", and a bucket includes 10,000 events total, with 1,000 of the 10,000 events having been generated by an e-mail server and including a field for size, then the data model summary may include or otherwise identify the 1,000 events and/or the values of the "size" fields of the 1,000 events. Thus, the set of data associated with the data model summary may be significantly smaller in size than the original set of data that is summarized. In some embodiments, a more complete report can be generated across a larger set of data, such as a large number of buckets managed by one or more indexers, using these types of data model summaries. For example, a search head may request these types of bucket data model summaries from all of the indexes in a system, and combine the events and/or values for the fields in all of the bucket data model summaries to generate full set of events and/or values for the fields of the data model. This process may be referred to as data model acceleration. With data model acceleration, the speed of generating the full set of data (e.g., values for the fields of the data model) at the search head can be increased due to the fact that the pre-generated data model summaries for the buckets (e.g., bucket data model summaries stored at the indexer) can be used to drive the features that make use of the data model (e.g., to populate the values for the fields of a pivot visualization generated using the data model). Thus, generation of the overall data model at the search head can avoid some or all of the processing overhead and time associated with generating the bucket level data model summaries because that processing has already been completed by the indexers.

The embodiments described herein can be employed with various techniques of report and/or data model acceleration, including those described in U.S. Pat. No. 8,682,925 titled "Distributed High Performance Analytics Data Store" issued Mar. 25, 2014; U.S. Pat. No. 8,682,886 titled "Report Acceleration Using Intermediate Summaries of Events" issued Mar. 25, 2014; and U.S. Pat. No. 8,516,008 titled "Flexible Schema Column Store" issued Aug. 20, 2013, which are each hereby incorporated by reference in their entireties.

In some embodiments, two or more summary processes can be executed concurrently (e.g., in parallel). Continuing with the above example, the indexer may execute a first summary process on the first bucket to summarize the 1000 events of e-mail server log data in the first bucket, and concurrently execute a second summary process on the second bucket to summarize the 1000 events of server log data in the second bucket. In some embodiments, each process may be executed by a different thread of one or more processors of the indexer. For example, the first process may be executed by a first thread of a processor of the indexer, and the second process may be executed by a second thread of the processor of the indexer.

In some embodiments, the summary processes can generate the same summaries for each of the buckets such that the processes concurrently to generate the same summaries for the data in the respective buckets. For example, a first summary process executed by the indexer can include a report summary for the average e-mail size indicated by events stored in the first bucket, a second summary process executed by the indexer can include a report summary for the average e-mail size indicated by events stored in the second bucket, and so forth.

In some embodiments, a summary for a bucket may be written to a summary file (or directory). For example, a report summary for the average e-mail size indicated by events in the first bucket may be written to a first summary file, a report summary for the average e-mail size indicated by events in the second bucket may be written to a second summary file, and so forth. In some embodiments, the summary files can be stored locally, in a memory of the indexer. In some embodiments, a bucket can be associated with different types of summaries. Continuing with the above example, in addition to the first and second summary files relating to e-mail size, a report summary for the count of e-mails processed between 12 pm and 1 pm from events in the first bucket may be written to a third summary file, a report summary for the count of e-mails processed between 12 pm and 1 pm from events in the second bucket may be written to a fourth summary file, a data model summary for e-mails processed by a particular e-mail server including the fields of date and size for events in the first bucket can be written to a fifth summary file, a data model summary for e-mails processed by the e-mail server including the fields of date and size for events in the second bucket can be written to a sixth summary file, and so forth.

In some embodiments, the concurrent execution of processes generating the same summary is facilitated by use of summary identifiers (IDs) and/or bucket IDs. As describe herein, use of these can help to ensure that two different processes that are generating the same type of summary are not operating concurrently on the same data. That is, for example, two processes are not generating conflicting or redundant summaries for the same bucket.

Figure 1B:
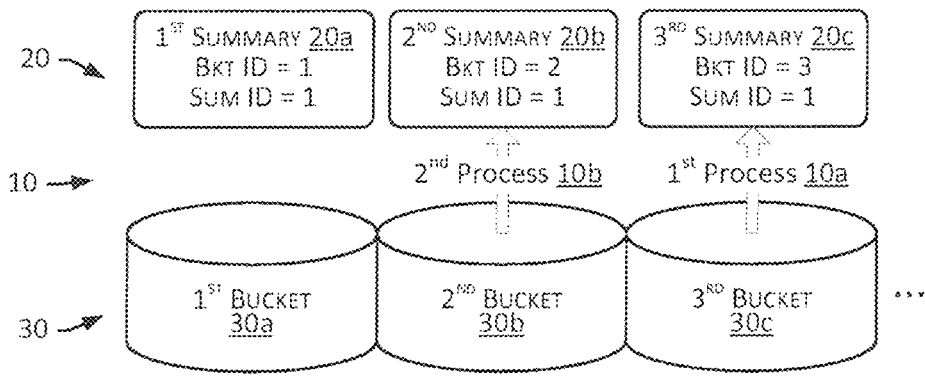
Figure 1C:
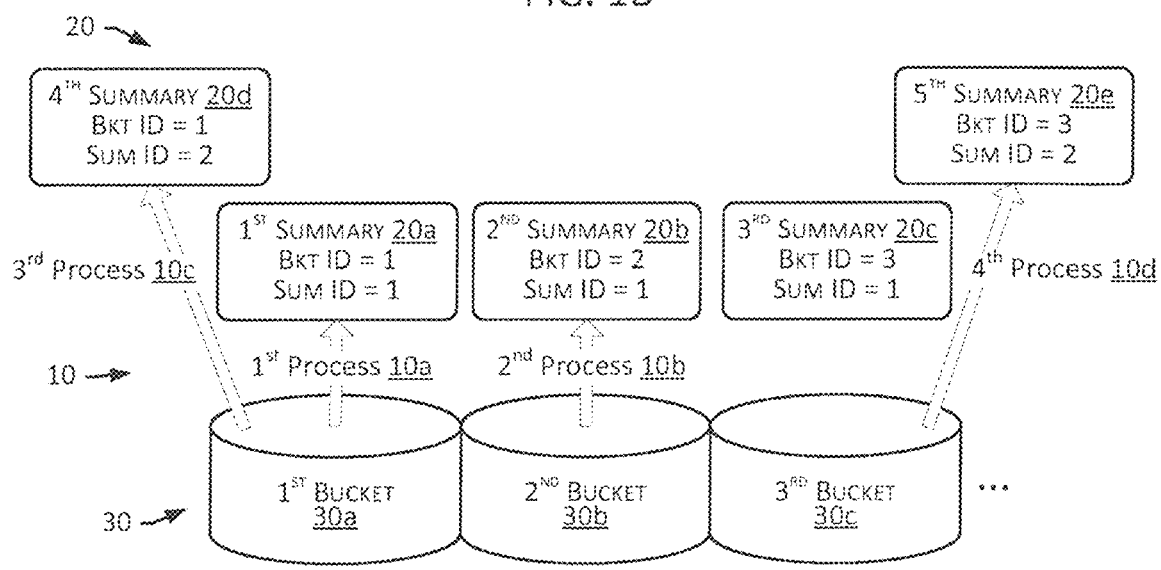

FIGS. 1A-1C are block diagrams that illustrates summarization processes 10 writing to respective summaries (e.g., summary files) 20 for different buckets 30. If an indexer receives a first summary request for a first type of summary associated with a summary ID of "1", then the indexer may determine where the relevant data to be summarized is located. If the indexer determines that the data to be summarized is located in at least the first, second, and third buckets 30a, 30b and 30c of the index managed by the indexer, then the indexer may launch two or more processes 10 for concurrently summarizing the data in the first, second, and third buckets 30a, 30b and 30c. For example, the indexer may launch a first process 10a to generate the first type of summary for the first, second, and third buckets. Referring to FIG. 1A, the first process 10a may proceed to generate the first type of summary for the first bucket 30a, including storing the data of the summary in a first summary file 20a associated with a bucket ID of 1 and a summary ID of 1. The first process 10a may also lock the first summary file 20a so that other processes 10 are inhibited from writing to the first summary file 20a. Shortly after the first process 10a starts to summarize the first bucket 30a, the indexer may receive another summary request for the first type of summary associated with a summary ID of "1" and the indexer may launch a second process 10b to summarize the first, second, and third buckets 30a, 30b and 30c. The second process 10b may attempt to access the first summary file 20a (associated with a bucket ID of 1 and a summary ID of 1) in an effort to summarize the first bucket 30a and determine that it is currently locked by the first process 10a. In response to determining that the first summary file 20a is locked, the second process 10b may attempt to generate the first type of summary for the second bucket 30b. This can include the second process 10b determining that a second summary file 20b associated with a bucket ID of 2 and a summary ID of 1 is not currently locked by another process 10 (or has not yet been generated) and storing the data for the summary in the second summary file 20b. The second process 10b may also lock the second summary file 20b so that other processes 10 (e.g., including the first process 10a) are inhibited from writing to the second summary file 20b.

Referring to FIG. 1B, when the first process 10a has completed summarizing the first bucket 30a, including completing writing of the summary data for the first bucket 30a to the first summary file 20a, the first process 10a may unlock the first summary file 20a and proceed to summarizing another bucket 30 that remains to be summarized (e.g., the second bucket 20b or the third bucket 20c). In a manner similar to that described above with regard to the second process 10b, if the first process 10b now attempts to summarize the second bucket 30b (while the second process 10b is still summarizing the data of the second bucket 30b), the first process 10a may attempt to access the second summary file 20b (associated with a bucket ID of 2 and a summary ID of 1) and determine that the second summary file 20b is currently locked by the second process 10b. In response to determining that the second summary file 20b is locked, the first process 10b may proceed to generating the first type of summary for the third bucket 30c. This can include the first process 10a determining that a third summary file 20c for the (associated a bucket ID of 3 and a summary ID of 1) is not currently locked by another process 10 (or has not yet been generated) and storing the data for the summary in the third summary file 20c. The first process 10a may also lock the third summary file 20c so that other processes 10 (e.g., including the second process 10b) are inhibited from writing to the third summary file 20c.

In some embodiments, writing to summary 20 for a bucket 30 can include writing an indication of whether all of the contents of the bucket 30 have been summarized and/or an indication of what contents of the bucket 30 have been summarized. For example, if writing to the bucket 30a has been completed and the first process 10a is able to summarize all of the contents of the bucket 30a and determine that writing of data to the bucket 30a is complete, then the first process 10a may write a bucket summary complete indicator (e.g., set a summary complete flag) in the summary data. Thus, for example, a process 10 that subsequently attempts to summarize the bucket 30a may determine that the summary for the bucket 30a is complete and may move on to summarizing another bucket 30. As a further example, if writing to the bucket 30a has not yet been completed and the first process 10a is able to summarize the current contents of the bucket 30a (e.g., about 3,000 events currently stored in the bucket 30a) and determine that writing of data to the bucket 30a is not complete, then the first process 10a may write in the summary data a bucket summary incomplete indicator (e.g., set a summary incomplete flag) and/or summary location of (e.g., a location of 3,000 indicating that the current summary 20a for the bucket 30a only summarized the first 3,000 events in the bucket 30a). Thus, for example, a process 10 that subsequently attempts to summarize the bucket 30a may determine that the at least a portion of the summary 20a for the bucket 30a has already been completed, process the un-summarized portion of the bucket 30a (e.g., the events after the first 3,000 events in the bucket 30a) and update the summary 20a accordingly. Thus, a process 10 may not have to re-summarize the data in a bucket 30 that has already been summarized by another process 10.

The first and second processes 10a and 10b may continue to execute in this "leap-frog" manner until they have each addressed all of the buckets they were assigned to summarize. For example, when finished summarizing the second bucket 30b, including completing writing of the summary data for the second bucket 30b to the second summary file 20b and unlocking the second summary file 20b, the second process 10b may attempt to summarize another bucket 30 assigned to it that remains to be summarized (e.g., the third bucket 30c). In a similar manner as described above, if the second process 10b now tries to summarize the third bucket 30c (while the first process 10a is still summarizing the data of the third bucket 30c), the second process 10b may attempt to access the third summary file 20c (associated with a bucket ID of 3 and a summary ID of 1) and determine that the third summary file 20c is currently locked by the first process 10a. In response to determining that the second summary file 20c is locked, the second process 10b may determine that all of the buckets 10 that is was assigned to summarize (e.g., the first, second, and third buckets 30a, 30b and 30c) have been addressed (e.g., based on the fact that it has generated a corresponding summary 20b with the ID 1 for the second bucket 30b, and it encountered the locked first and third summaries 20a and 20b indicating that another process 10 is generating or has already generated a summary 20 with the ID 1 for the first and third buckets 30a and 30c). The second process 10b may terminate in response to this determination. Further, once finished summarizing the third bucket 30c, including completing writing of the summary data for the third bucket 30c to the third summary file 20c and unlocking the third summary file 20c, the first process 10a may determine that all of the buckets 30 that is was assigned to summarize have been addressed (e.g., based on the fact that it has generated a corresponding summary 20 with the ID 1 for the first and third buckets 30a and 30c, and it encountered the locked second summary 20b indicating that another process 10 is generating or has already generated a summary with the ID 1 for the second bucket 30b). The first process 10a may terminate in response to this determination.

In some embodiments, processes for generating summaries of data may not be inhibited from summarizing the data while another process is generating a different summary of the same data. Continuing with the above example described with regard to FIG. 1C, if the indexer receives a request for a second type of summary associated with a summary ID of "2", then the indexer may determine that the data to be summarized is located in at least the first and third buckets 30a and 30c of the index managed by the indexer. The indexer may then launch a third processes 10c to generate the second type of summary for the first and third buckets 30a and 30c. The third process 10c may proceed to generating the second type of summary for the first bucket 30a, including determining that a fourth summary file 20d (associated a bucket ID of 1 and a summary ID of 2) is not currently locked by another process 10 (or has not yet been generated) and storing the data for the summary in the fourth summary filed 20d. The third process 10c may also lock the fourth summary file 20d so that other processes 10 (e.g., such as subsequent process 10 for the second type of summary) are inhibited from writing to the fourth summary file 20c. Shortly after the third process 10c starts to summarize the first bucket 30a, the indexer may receive another request for a second type of summary associated with a summary ID of "2", and the indexer may launch to summarize the first and third bucket 30a and 30c. The fourth process 10d may attempt to access the fourth summary file 20d (associated with a bucket ID of 1 and a summary ID of 2) in an effort to summarize the first bucket 30a and determine that it is currently locked by the third process 10c. In response to determining that the fourth summary file 20d is locked, the fourth process 10d may proceed to generating the second type of summary for the third bucket 30c. This can include the fourth process 10d determining that a fifth summary file 20e associated a bucket ID of 3 and a summary ID of 2 is not currently locked by another process 10 (or has not yet been generated) and storing the data for the summary in the fifth summary file 20e. The fourth process 10d may also lock the fifth summary file 20e so that other processes 10 (e.g., including the third process 10c) are inhibited from writing to the fifth summary file 20e. When each of the third and fourth processes 10c and 10d determine that all of the buckets they were assigned to summarize have been addressed, they may terminate.

In some embodiments, a maximum number of parallel processes can be defined for an indexer. The maximum number of parallel process may define a maximum number of summarization processes that an indexer can execute concurrently. Continuing with the above example, if a user (e.g., an administrator) set a maximum number of parallel process for the indexer to 3, then the indexer may execute the first, second and third processes 10a, 10b and 10c in parallel, but may not be allowed to execute the fourth process 10d until after at least one of the first, second and third processes 10a, 10b and 10c completes or is otherwise terminated. As described herein, in some embodiments, a scheduling entity, such as a search head, may employ a maximum number of parallel processes via the scheduling and/or sending of summary request to an indexer. For example, a search head may not send a summary requests to an indexer if the indexer already executing the maximum number of processes.

In some embodiments, a minimum process delay for initiating parallel process can be defined for an indexer. The minimum process delay may define a minimum time between starting parallel processes. For example, minimum process delay of 5 minutes for an indexer would indicate that an indexer is not allowed to launch a process within 5 minutes after launching another process. Continuing with the above example, if a user (e.g., an administrator) set a minimum process delay of 5 minutes for the indexer, then the indexer may not be allowed to launch the second process 10b until at least 5 min have passed since the first process 10a was launched. As described herein, in some embodiments, a scheduling entity, such as a search head, may employ a minimum process delay via the scheduling and/or sending of summary requests to an indexer. For example, a search head may ensure that at least the minimum delay occurs between the sending of summary requests to an indexer.

Accordingly, embodiments may enable multiple summarization processes to execute in parallel without generating conflicting or redundant summary data. This may enable summarization processes to be completed in a relatively fast and efficient manner. In some embodiments, as discussed above, summarization processes can be executed by an indexer of a larger data processing system, such as a SPLUNK® ENTERPRISE system produced by Splunk Inc. of San Francisco, Calif., to store and process performance data, described in more detail herein with regard to at least FIGS. 1 and 5-11D. Further, the resulting summaries (e.g., the bucket level summaries) can be used, for example, in report acceleration and/or data model acceleration processes. For example, in the context of a larger data processing system, such as a SPLUNK® ENTERPRISE system, bucket summaries for each of one or more buckets of one or more indexers can be employed by a search head to generate reports, search results, and the like for the larger set of data contained in the buckets.

Figure 2:
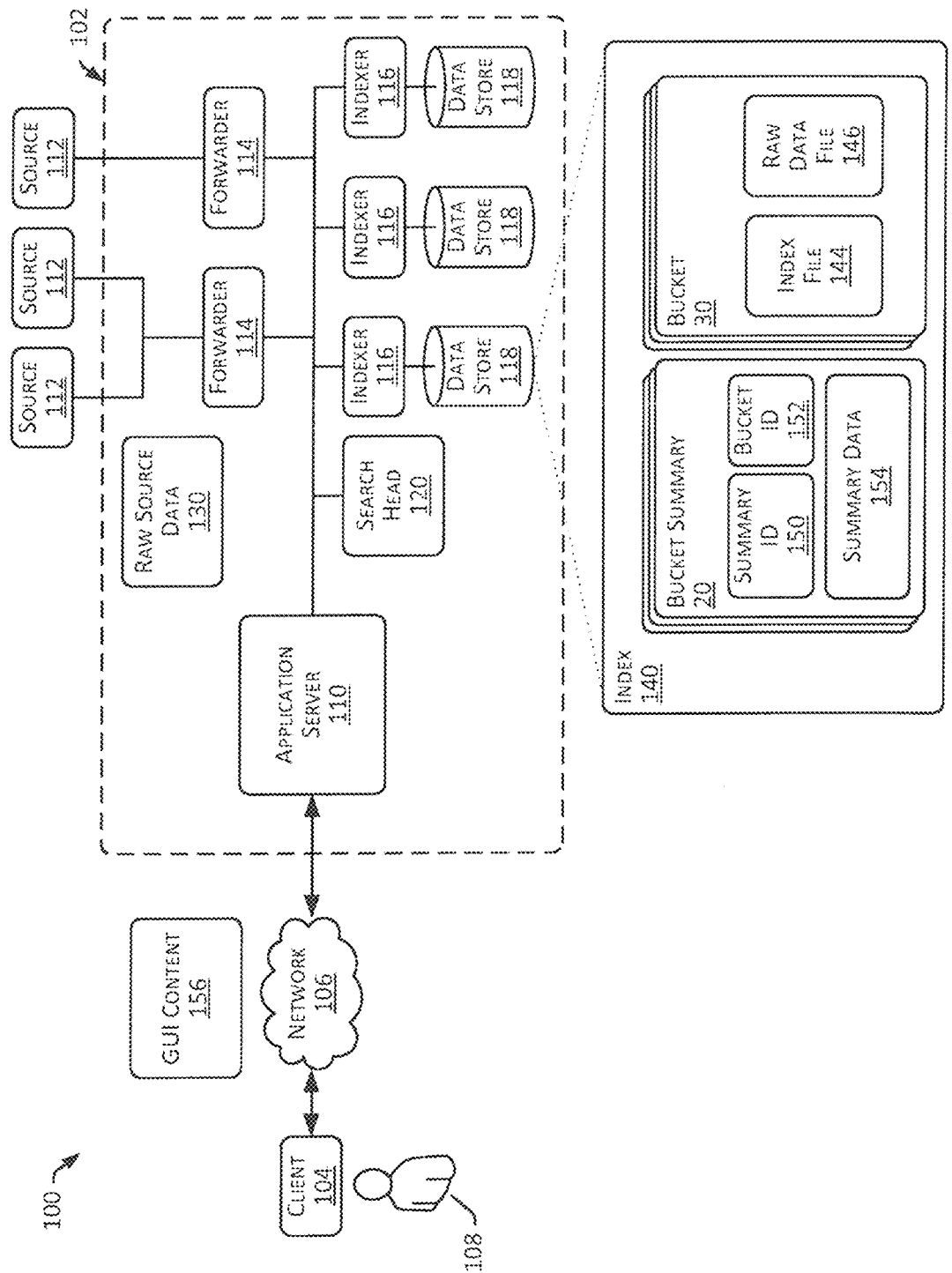
FIG. 2 is block diagram that illustrates an example data processing environment in accordance with the disclosed embodiments.

FIG. 2 illustrates an example data processing environment ("environment") 100 in accordance with the disclosed embodiments. In some embodiments, the environment 100 can include an event-processing system ("system") 102 communicatively coupled to one or more client devices 104 via a communications network 106. The client device 104 may be used or otherwise accessed by a user 108, such its a system administrator or a customer.

In some embodiments, the system 102 can include an application server 110, one or more data sources ("sources") 112, one or more forwarders 114, one or more indexers 116, one or more index data stores 118, and/or one or more search heads 120. As described herein, data may be indexed and stored in one or more indexes 140. An index 140 can include a logical grouping of data (e.g., having common characteristics). As further described herein, an index 140 can include one or more buckets 30, and each of the buckets 30 can include an index file 144 and/or a raw data file 146. A raw data file 146 may include raw source data 130 in compressed form. An index file 144 may include index data that points to the location of certain data within the raw data file 146.

The network 106 may include an element or system that facilitates communication between the entities of the environment 100 (e.g., including the application server 110 and the client devices 104). The network 106 may include an electronic communications network, such as the Internet, a local area network (LAN), a wide area network (WAN), a wireless local area network (WLAN), a cellular communications network, and/or the like. In some embodiments, the network 106 can include a wired or a wireless network. In some embodiments, the network 106 can include a single network or a combination of networks.

A client device 104 may include any variety of electronic devices. In some embodiments, a client device 104 can include a device capable of communicating information via the network 106. A client device 104 may include one or more computer devices, such as a desktop computer, a server, a laptop computer, a tablet computer, a wearable computer device, a personal digital assistant (PDA), a smart phone, and/or the like. In some embodiments, a client device 104 may be a client of the application server 110. In some embodiments, a client device 104 can include various input/output (I/O) interfaces, such as a display (e.g., for displaying a graphical user interface (GUI)), an audible output user interface (e.g., a speaker), an audible input user interface (e.g., a microphone), an image acquisition interface (e.g., a camera), a keyboard, a pointer/selection device (e.g., a mouse, a trackball, a touchpad, a touchscreen, a gesture capture or detecting device, or a stylus), and/or the like. In some embodiments, a client device 104 can include general computing components and/or embedded systems optimized with specific components for performing specific tasks. In some embodiments, a client device 104 can include programs/applications that can be used to generate a request for content, to provide content, to render content, and/or to send and/or receive requests to and/or from other devices via the network 106. For example, a client device 104 may include an Internet browser application that facilitates communication with the application server 110 via the network 106. In some embodiments, a program, or application, of a client device 104 can include program modules having program instructions that are executable by a computer system to perform some or all of the functionality described herein with regard to at least client device(s) 104. In some embodiments, a client device 104 can include one or more computer systems similar to that of the computer system 1000 described below with regard to at least FIG. 4.

The application server 110 may include a computing device having network connectivity and being capable of providing one or more services to network clients, such as a client device 104. These services may include ingesting, processing, storing, monitoring, and/or searching data. Although certain embodiments are described with regard to a single server for the purpose of illustration, embodiments may include employing multiple servers, such as a plurality of distributed servers. In some embodiments, the application, server 110 can include one or more computer systems similar to that of the computer system 1000 described below with regard to at least FIG. 4.

A data source (also referred to as a "source" or "data input") 112 may be a source of incoming source data (also referred to as "event data") 130 being fed into the system 102. A data source 112 may include one or more external data sources, such as web servers, application servers, databases, firewalls, routers, operating systems, and software applications that execute on computer systems, mobile devices, sensors, and/or the like. A data source 112 may be located remote from the system 102. For example, a data source 112 may be defined on an agent computer operating remote from the system 102, such as on-site at a customer's location, that transmits source data 130 to one or more forwarders 114 via a communications network (e.g., network 106). The source data 130 can be a stream or set of data fed to an entity of the system 102, such as a forwarder 114. The source data 130 may include, for example, raw machine-generated time-series data, such as server log files, activity log files, configuration files, messages, network packet data, performance measurements, sensor measurements, and/or the like. A data source 112 may be local to (e.g., integrated with) the system 102. For example, a data source 112 may be defined on a forwarder 114. In some embodiments, the data sources 112 can be the same or similar to the data sources 1105 described below with regard to at least FIG. 5. In some embodiments, a source 112 can include one or more computer systems similar to that of the computer system 1000 described below with regard to at least FIG. 4.

A forwarder 114 may be an entity of the system 102 that forwards data to another entity of the system, such as an indexer 116, another forwarder 114, or a third-party system. An entity that receives data from a forwarder 114, such as an indexer 116, may be referred to as a receiver entity. In some embodiments, the forwarders 114 can be the same or similar to the forwarders 1101 described below with regard to at least FIG. 5. In some embodiments, a forwarder 114 can include one or more computer systems similar to that of the computer system 1000 described below with regard to at least FIG. 4.

An indexer 116 may be an entity of the system 102 that indexes raw source data 130, transforming into events and placing the results into an index 140. An indexer 116 may also search indexes 140 in response to search requests. An indexer 116 may perform other functions, such as data input and search management. In some instances, the forwarders 114 handle data input, and forward the source data 130 to the indexers 116 for indexing. An indexer 116 may perform searches across its own stored data (e.g., the data of indexes 140 stored in an index data store 118 managed by the indexer 116). In some instances, a search head 120 can handle search management and coordinate searches across multiple indexers 116. In some embodiments, the indexer 116 can be the same or similar to the indexers 1102 described below with regard to at least FIG. 5. In some embodiments, an indexer 116 can include one or more computer systems similar to that of the computer system 1000 described below with regard to at least FIG. 4.

The process of indexing data may be part of a larger sequence of processing data. In some embodiments, a "data pipeline" refers to a route that data takes through an event-processing system 102, from its origin in sources, such as log files and network feeds, to its transformation into searchable events that encapsulate valuable knowledge. Such a data pipeline may include, for example, an input segment, a parsing segment, an indexing segment, and a search segment. Each segment may be conducted by one or more entities of the system 102, such as one or more forwarders 114, one or more indexers 116, and/or one or more search heads 120 of system 102.

During the input segment (e.g., the first segment of the data pipeline), system 102 may acquire a raw data stream (e.g., source data 130) from its source (a source 112), break it into blocks (e.g., 64K blocks of data), and/or annotate each block with metadata keys. After the data has been input, it may be moved to the next segment of the pipeline (parsing). The data input segment may be conducted, for example, by a forwarder 114 and/or an indexer 116 of system 102. In some instances, a parsing queue in the data pipeline holds data after it enters the system but before parsing (a first phase of the event processing) occurs. Thus, incoming data may first go to the parsing queue and from there to the parsing segment.

During the parsing segment (e.g., the second segment of the data pipeline), system 102 may conduct parsing, a first stage of the event processing of the raw data (e.g., source data 130). This can include, for example, extracting a set of default fields for each event, including host, source and source type, configuring character set encoding, identifying line termination using line breaking rules, identifying event boundaries, identifying event timestamps (or creating them if they don't exist), masking sensitive event data (such as credit card or social security numbers), applying custom metadata to incoming events, and/or the like. Accordingly, during this first stage of event processing, the raw data may be data broken into into individual events, and the parsed data may be moved to the next segment of the pipeline (indexing). The parsing segment may be conducted, for example, by a heavy forwarder 114 and/or an indexer 116 of system 102.

During the indexing segment (e.g., the third segment of the data pipeline), system 102 may perform indexing of the parsed data, a second stage of the event processing. This can include, for example, breaking all events into segments that can then be searched upon, building the index data structures, and writing the raw data and index files to disk, where post-indexing compression occurs. Accordingly, during the second stage of the event processing, the parsed data (also referred to as "events") may be written to a search index on disk (e.g., written to an index 140 in an index data store 118). The indexing segment may be conducted, for example, by an indexer 116 of system 102. In some embodiments, both parsing and indexing can take place on the same indexer 116. In some embodiments, an index queue in the data pipeline holds parsed events waiting to be indexed. Thus, incoming data may go from the parsing queue to the parsing segment of the pipeline where it undergoes parsing, and the processed data may move to the index queue and ultimately on to the indexing segment, where the index is built.

During the searching segment (e.g., the fourth segment of the data pipeline), system 102 may conduct searches of the indexed data to identify and access data that is responsive to search queries. This can include, for example, identifying stored events in a raw data that are responsive to user specified search criteria. For example, if indexed data is stored in a data store 118 of an indexer 116, and the indexer 116 is assigned a search task by the search head 120, then the indexer 116 may search the data store 118 for data responsive to the search and send any responsive data back to the search head 120. The search head 120 may send similar search tasks to other indexers 116, consolidate the responsive data received from the indexers 116, and provide the consolidated search results (e.g., to a client device 104 for display to a user).

An index data store 118 may include a medium for the storage of data thereon. For example, a data store 118 may include a non-transitory computer-readable medium storing data thereon that is accessible by entities of the environment 100, such as the corresponding indexer 116. The data may include, for example, one or more indexes 140 including one or more buckets 30, and the buckets 30 may include an index file 144 and/or a raw data file 146 (e.g., including parsed, time-stamped events). In some embodiments, each data store 118 is managed by a given indexer 116 that stores data to the data store 118 and/or performs searches of the data stored on the data store 118. Although certain embodiments are described with regard to a single data store 118 for the purpose of illustration, embodiments may include employing multiple data stores 118, such as a plurality of distributed data stores 118. In some embodiments, an index data store 118 is the same or similar to the data stores 1103 described below with regard to at least FIG. 5.

A bucket 30 may be a directory or partition containing part of an index 140. A bucket 30 may contain both the raw data file 146 and a corresponding set of index files 144. A raw data file 146 may be a compressed file in an index bucket 142 that contains event data, as well as journal information that the indexer can use to reconstitute the index's metadata files ("index files"). For example, an indexer 116 may receive machine-generated raw source data 130 including events generated by a source 112 (e.g., log data from an e-mail server), and the indexer 116 may index and store the events in buckets 30 managed by the indexer. The events may be time stamped (or otherwise associated with a time) and the indexer 116 may index and store the events in certain buckets 30 based on the time associated with the events. For example, the indexer may index and store the first 1000 events generated by the e-mail server in a first bucket 30, index and store the second 1000 events generated by the e-mail server in a second bucket 30, and so forth. Thus, each of the buckets 30 may store a subset of events of a similar age, or at least being associated with a given timespan (e.g., a timespan from the time associated with the earliest event in the bucket 30 to the time associated with latest event in the bucket 30). In such an embodiment, the first bucket 30 may include a first raw data file 146 that is a compressed file including the data of the first 1000 events generated by the e-mail server, and a first index file 144 that includes the metadata for the 1000 events stored in the first bucket 30. Similarly, the second bucket 30 may include a second raw data file 146 that is a compressed file including the data of the first 1000 events generated by the e-mail server, and a second index file 144 that includes the metadata for the 1000 events stored in the second bucket 30.

An index 140 may consist of one or more buckets 30 organized, for example, by age, and which may roll through one or more stages in their transition to retirement and eventual archiving or deletion. The stages may include, for example, a hot stage, a warm stage, a cold stage, a frozen stage, and a thawed stage. The data may transition across the stages in the following order as the data ages: hot, warm, cold, frozen, thawed. Each of the stages may be associated with a corresponding bucket that holds data for that stage. A hot bucket 30 may be a location to store data subject to intensive read and write operations, e.g., where the indexing occurs. A warm bucket 30 may be a location to store data subjected to mostly read and optimization operations. A cold bucket 30 may be a location to store data subjected to search operations. A frozen bucket 30 may be a location to store data that is queued for deletion or archiving. A thawed bucket 30 may be used to re-import data from frozen buckets. Freshly indexed data may start out in a hot bucket 30 that is actively being written to. The data of a hot bucket 30 may be stored temporarily in a memory location, such as in flash memory of the indexer 116. When the hot data bucket 30 reaches a specified size or age, the bucket 30 may be transitioned into (or "rolled to") a warm, data bucket 30, and a new hot data bucket 30 may be created. Similar to the hot bucket 30, the data of a warm bucket 30 may be stored temporarily in a memory location, such as flash memory of the indexer 116. After some time, the bucket 30 may be transitioned into (or "rolled to") a cold bucket 30. The data of a cold bucket 30 may be stored in a more permanent location that remains searchable, such as a hard drive of the indexer 116. A cold bucket 30 may eventually transition into a frozen bucket 30 that is later deleted or archived. The data of a frozen bucket 30 may be stored an archive that is not readily searchable, such as a tape drive of the indexer 116. If data is to be returned to a cold bucket 30, it may be moved in a thawed bucket 30, during its transition from the frozen bucket 30 to the cold bucket 30, such as during its transition from a tape drive to the hard drive. The states of various buckets 30 and/or the discarding or archiving of data for an index 140 may be based on data retention settings specified by an index definition for the index 140.

In some embodiments, an index 140 can include one or more summaries (also referred to as "bucket summaries") 20 for one or more of the buckets 30 of the index 140. A bucket summary 20 can include a bucket summary ID 150, a bucket ID 152 and/or summary data 154. A bucket summary may include a file or directory in the data store 118 of the indexer. Although the depicted embodiment illustrates the bucket summaries 20 store separately from the buckets 30, in some embodiments, a bucket summary 20 may be stored in the bucket (e.g., in the partition including the raw data file 146 and the index file for the bucket 30 that the summary corresponds to). The summary ID 150 may identify the particular summary being generated. For example, bucket summaries 20 for summarizing e-mail size (e.g., including a count and total size for e-mail processed by an e-mails server) may have a summary ID 150 of "1", bucket summaries 20 for summarizing e-mail count (e.g., including a count of e-mails processed by the e-mail server between 12 pm and 1 pm) may have a summary ID of "2", and so forth. The bucket ID 150 may identify the particular bucket for which the summary is generated. For example, bucket summaries 20 for summarizing events in a first bucket 30 may have a bucket ID 152 of "1", bucket summaries 20 for summarizing events in a second bucket 30 may have a bucket ID 152 of "2", and so forth. The summary data 154 can include the data summarizing the contents of the corresponding bucket 30. For example, if a first bucket summary 20 corresponds a report summary for summarizing e-mail size (e.g., including a count and total size for e-mail processed by an e-mails server) for a first bucket 30 that contains 10,000 events generated by an e-mail sever and 1000 of those events indicate processing of an e-mail and include a size field, then the summary data 154 for the first bucket summary 20 may include a count of the events indicate processing of an e-mail and include a size field (e.g., count=1000) and a sum of the values in the size fields in those events (e.g., total size=1000 MB). As described herein, such pre-computed values can be used, for example, to generate an average e-mail "size" for that bucket of data (e.g., average e-mail size for the first bucket=1 MB). As a further example, if a second bucket summary 20 corresponds a data model summary for identifying the size fields of events indicating e-mails processed by the e-mail server, and the first bucket includes 10,000 events total, with 1,000 of the 10,000 events indicating e-mails processed by the e-mail server and including a field for size, then the summary data 154 for the second bucket summary 20 may include or otherwise identify the 1,000 events and/or the values of the size fields of the 1,000 events.

A search head 120 may be an entity of the system 102 that handles search requests and/or consolidates the search results for presentation to a user. In a distributed search environment (e.g., including multiple indexers 116), a search head 120 may distribute search requests across a set of indexers 116 that perform the actual searching to generate individual sets of search results, and then merge the individual sets of search results into a consolidated set of search results that are provided to the user. In a non-distributed search environment (e.g., including only a single indexer 116), the indexer 116 may assume the role of a search head 120 and may handle the search management, as well as the indexing and searching functions. An entity of the system 102 may function as both a search head 120 and a search peer. If an entity does only searching (and not any indexing), it is usually referred to as a dedicated search head. A search head cluster may be a group of search heads 120 that serve as a central resource for searching. In some embodiments, a search head 120 is the same or similar to the search head 1104 described below with regard to at least FIG. 5. In some embodiments, the search head 120 can include one or more computer systems similar to that of the computer system 1000 described below with regard to at least FIG. 4.

In some embodiments, a search head 120 may distribute summary tasks to one or more indexers 116. For example, a search head 120 may determine that a summary of a set of data needs to be generated, identify the indexers 116 that manage indexed data relevant to the summary, and distribute one or more summary requests to each of the identified indexers 116. A described herein, in some embodiments, the search head 120 may send summary request to an in accordance with configurations of the indexer 116, such as the maximum number of parallel process, minimum process delay, and/or the like for the indexer 116. The indexers 116 may, in turn, execute one or more processes (e.g., including parallel summary processes 10) to generate corresponding bucket summaries. For example, a search head 120 may determine that a summary of the size of e-mails processed by a particular e-mail server needs to be generated (e.g., including a count and total size for e-mails processed the e-mail server), the search head 120 may identify a ten indexers 116 that have log-data from the e-mail server, and distribute one or more corresponding summary requests to each of the ten indexers 116. Each of the indexers 116 may, in turn, execute one or more processes (e.g., including parallel summary processes 10) to generate corresponding bucket summaries 20 (e.g., each bucket summary 20 including a count and total size for e-mails processed the e-mail server determined from the events stored in the bucket 30 corresponding to the bucket summary 20). As a further example, a search head 120 may determine that a data model summary for e-mails processed by a particular e-mail server including the date field needs to be generated, the search head 120 may identify ten indexers 116 that have log-data from the e-mail server, and distribute one or more corresponding summary requests to each of the ten indexers 116. Each of the indexes 116 may, in turn, execute one or more processes (e.g., including parallel summary processes 10) to generate corresponding bucket summaries 20 (e.g., each bucket summary 20 including or otherwise identifying the events and/or the values of the size fields of the events generated by the e-mail server from tire events stored in the bucket 30 corresponding to the bucket summary 20).

In some embodiments, a search head may combine bucket summaries 20 from some or all of the indexers 116 in a system. For example, during report acceleration process, a search head 120 may request the above described report bucket summaries 20 from the ten indexers 116, and combine counts of events and size values from all of the bucket summaries 20 to generate an average e-mail size indicated by the larger set of data (e.g., the average e-mail size from the events indicated by the events stored the buckets 30 of the ten indexers 116). This average value may, for example, be provided to the search server 110 for presentation to the user 108. For example, the application server 110 may serve, to the client device for display to the user 108, GUI content 156 including the average e-mail size. As a further example, during a data model acceleration process, a search head 120 may request the above described data model bucket summaries 20 from the ten indexers 116, and combine the events and/or values of the size fields from all of the bucket summaries 20 to generate full set of events and/or values of the size fields. The events and/or filed values of the combined data model summary may, for example, be provided to the search server 110 for presentation to the user 108. For example, the application server 110 may serve, to the client device for display to the user 108, GUI content 156 including a pivot visualization of the data (e.g., a visualization of the events and/or filed values of the combined data model summary). Such data model reporting and visualizations are described in U.S. patent application Ser. No. 14/503,335 titled "Generating Reports from Unstructured Data" and filed on Sep. 30,2014, which is hereby incorporated by reference in its entirety.

Figure 3A:
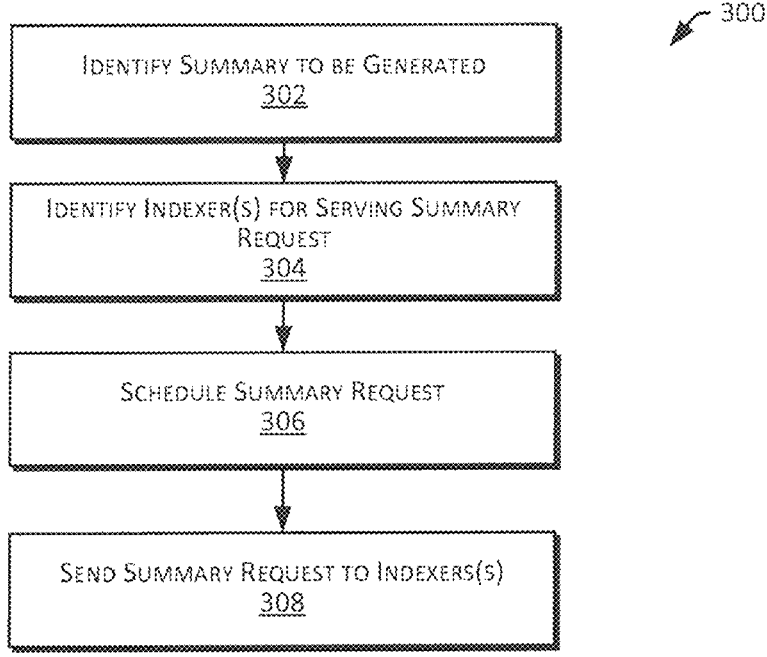
FIG. 3A is a flowchart that illustrates an example method for generating summary requests in accordance with the disclosed embodiments.

FIG. 3A is a flowchart that illustrates an example method 300 for generating summary requests in accordance with the disclosed embodiments. Some or all of the elements of the method 300 may be performed, for example, by one or more scheduling entities of the system 102, such as one or more search heads 120. Method 300 may include identifying a summary to be generated (block 302). For example, a search head 120 may determine that a report summary (e.g., including a count and total size for e-mails processed the e-mail server) needs to be generated in response to a user enabling acceleration of a report on the average size of e-mails processed by an e-mail server. As a further example, the search head 120 may determine that a data model summary (e.g., for the date field of e-mails processed by the e-mail server) needs to be generated in response to a user enabling acceleration of a data model for the date field of e-mails processed by the e-mail server.

Method 300 may include identifying one or more indexers for serving the summary request (block 304). In some embodiments identifying indexers for serving the summary request can include identifying one or more indexers 116 that manage data stores holding data (e.g., events) relevant to the summary to be generated. Continuing with the above example, the search head 120 may identify ten indexers 116 (e.g., including a first indexer 116) that have log-data from the e-mail server.

Method 300 may include scheduling the summary request (block 306). In some embodiments scheduling the summary request can include assessing the processing load of the identified indexers, and determining a schedule for sending summary requests to the indexers 116 based on the processing loads. This can include determining, for each of the indexers 116, whether a maximum number of parallel processes are currently executing and/or a minimum process delay has been satisfied. In some embodiments, determining whether a maximum number of processes are currently executing on an indexer 116 can include the search head 120 determining whether the number of summary processes currently being executed by the indexer 116 is equal to or greater than the maximum number of processes (e.g., specified in an index configuration file) for the indexer 116. If the indexer 116 is configured to handle a maximum of 5 concurrent summarization processes, for example, and 5 processes are currently being executed by the first indexer 116, then the search head 120 may determine that the maximum number of processes is not currently being executed. Conversely, if 10 processes are currently being executed by the first indexer 116, then the search head 120 may determine that the maximum number of processes is currently being executed. In some embodiments, determining whether a minimum process delay has been satisfied for an indexer 116 can include the search head 120 determining whether a time equal to or greater than the minimum delay for an indexer 116 (e.g., specified in an index configuration file for the indexer 116) has passed since the last summarization process was launched by the indexer 116. If the indexer 116 is configured to have a minimum delay of 5 minutes between launching summarization processes 10, and the last process was launched on the indexer 116 6 minutes ago, then the search head 120 may determine that the minimum process delay has been satisfied. Conversely, if the last process was launched 3 minutes ago, then the search head 120 may determine that the minimum process delay has not been satisfied. In some embodiments, the search head may determine a process to have been launched at about the time of the search head sent a corresponding request to launch the process.

In response to determining that the maximum number of processes are currently executing on an indexer 116 and/or determining that the minimum process delay has not been satisfied, the search head 120 may not schedule a summary request to be sent immediately, but may instead schedule a summary request to be sent at a later time, when the minimum process delay has been satisfied and less than the maximum number of processes are currently executing on the indexer 110. That is, the search head 120 may schedule the summary request to be sent when both conditions are satisfied. If for example, the search head 120 determines that no processes are currently being executed on an indexer 116, the search head may schedule a summary request (e.g., a report summary request for a count and total size for e-mails processed the e-mail server and/or a data model request for the date field of e-mails processed by the e-mail server) to be sent every 5 minutes to each of the indexers 116, up until ten processes are executing concurrently each of the respective indexers 116 or the summarization tasks is terminated completed (e.g., the user disables the corresponding report acceleration).

Method 300 may include sending summary request to the indexers (block 306). In some embodiments sending summary request to the indexers can include sending summary requests to the identified indexers 116 in accordance with the determined schedule for summary requests. For example, if ten indexers are identified that do not have any summary processes being executed and prior summary processes on each of the indexers were generated more than 5 minutes ago, the search head 120 may send summary requests (e.g., a report summary request for a count and total size for e-mails processed the e-mail server and/or a data model request for the date field of e-mails processed by the e-mail server) to each of the indexers 116 every 5 minutes, up until ten processes are executing concurrently each of the respective indexers 116 or the summarization tasks is terminated or otherwise completed (e.g., the user disables the corresponding report acceleration). In some embodiments, each of the summary requests may be associated with a summary ID. For example, the report summary request for a count and total size for e-mails processed the e-mail server may be associated with a summary ID of "1", a data model summary request for a data model summary for the date field of e-mails processed by the e-mail server may be associated with a summary ID of "3", and so forth. The summary ID may be included in the summary request. For example, the report summary request for a count and total size for e-mails processed the e-mail server may include a summary ID of "1" in the request.

Figure 3B:
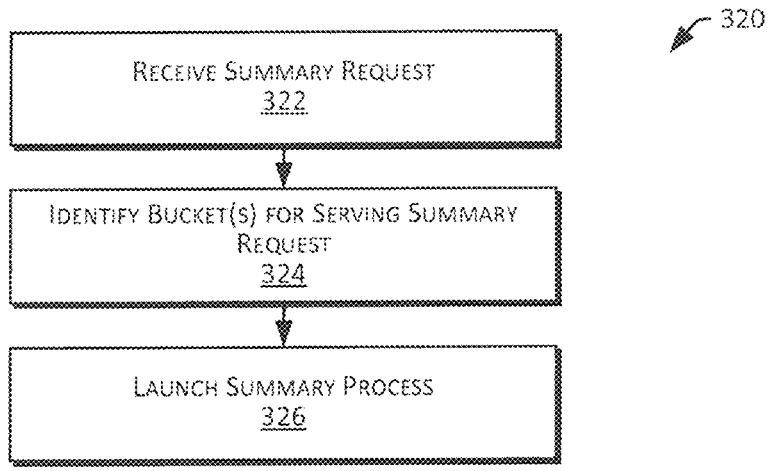
FIG. 3B is a flowchart that illustrates an example method for launching summarization processes in accordance with the disclosed embodiments.

FIG. 3B is a flowchart that illustrates an example method 320 for launching summary requests in accordance with the disclosed embodiments. Some or all of the elements of the method 320 may be performed, for example, by one or more indexers 116. Method 320 may include receiving a summary request (block 322). In some embodiments, receiving a summary request can include an indexer 116 receiving a summary request from a search head 120. For example, a first of the ten indexers 116 may receive a report summary request (e.g., including a count and total size for e-mails processed the e-mail server) from the search head every 5 minutes up until ten processes are executing concurrently on the indexer 116 or the summarization tasks is terminated completed.

Method 320 may include identifying buckets for servicing the summary request (block 324). In some embodiments, identifying buckets for servicing the summary request can include the first indexers 116 identifying one or mere of the buckets 30 in the index 140 managed by the indexer 116 (e.g., buckets 30 in the data store 118 for the indexer 116) that include one or more events that are relevant to the summary request. Continuing with the above examples of report summary requests (e.g., relating to a report summary request for a count and total size for e-mails processed the e-mail server or a data model request for the date field of e-mails processed by the e-mail server), the first indexer 116 may identify three of its buckets 30 (e.g., first, second and third buckets 30) as containing events of log data received from the e-mail server that are relevant to the request. Continuing with the above example regarding the request for a data model summary for the date field of events for e-mails processed by the e-mail server, the first indexer 116 may identify three of its buckets 30 (e.g., the first, second and third buckets 30) as containing events of log data received from the e-mail server.

Method 320 may include launching a summary process (block 326). In some embodiments, launching a summary process includes the indexer 116 launching a process corresponding to the received summary request. For example, if the received summary request includes a report summary request for a count and total size for e-mails processed the e-mail server and associated with a summary ID of "1" and the indexer identifies first, second and third buckets 30 in its index 140 as containing relevant data (e.g., events of log data received from the e-mail server), then the indexer 116 may initiate execution of a process assigned to generate corresponding report bucket summaries with a summary ID of "1" for each of the first, second and third buckets 30 in its index 140. Similarly, if the received summary request includes a data model summary request for the date field of events for e-mails processed by the e-mail server and associated with a summary ID of "3" and the indexer 116 identifies the first, second and third buckets 30 in its index 140 as containing relevant data (e.g., events of log data received from the e-mail server), then the indexer 116 may initiate execution of a process assigned to generate corresponding data model bucket summaries with a summary ID of "3" for each of the first, second and third buckets 30 in its index 140. A process that is the same or similar to that described with regard to method 320 may be executed by the indexer 116 for each summary request received by the indexer 116 (e.g., received from a search head 120). Although certain embodiments are described with regard to identifying buckets for servicing the summary request (block 324) and, then, launching a summary process (block 326), embodiments can include executing these elements in any suitable order. For example, a summary process may be launched before identifying the buckets for servicing the summary request are identified. That is, for example, launching a summary process (block 326) may occur before identifying buckets for servicing the summary request (block 324).

Figure 3C:
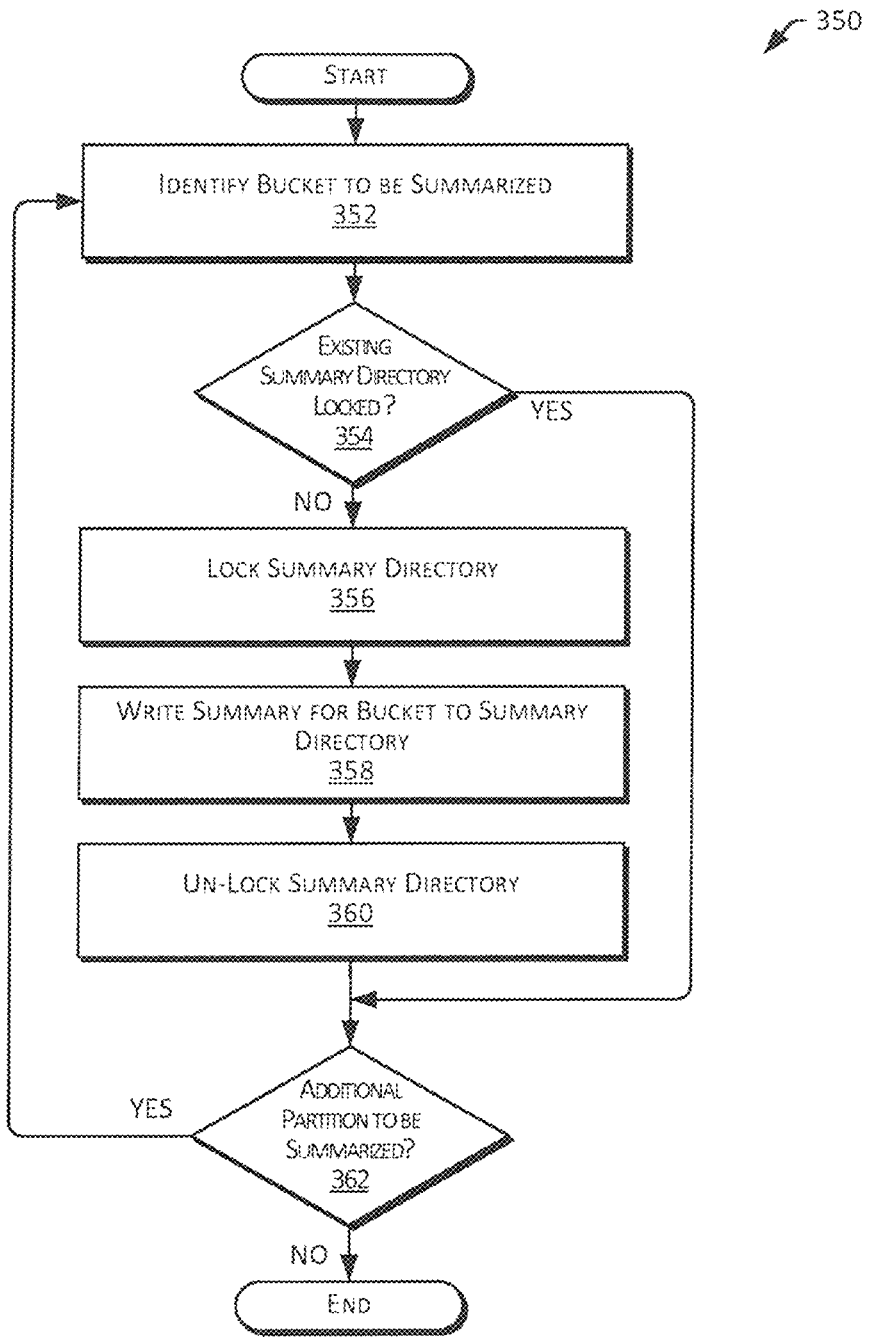
FIG. 3C is a flowchart that illustrates an example summarization processes in accordance with the disclosed embodiments.

FIG. 3C is a flowchart that illustrates an example method 350 for executing summarization processes in accordance with the disclosed embodiments. Some or all of the elements of the method 350 may be performed, for example, by one or more processes launched or otherwise executed by an indexer 116. The method 350 may provide a summary process for summarizing buckets of data concurrently (e.g., in parallel) with other summary processes. Method 300 may include identifying a bucket to be summarized (block 352). In some embodiments, identifying a bucket to be summarized can include the process identifying one of one or more of the buckets it is assigned to summarize that has not yet been addressed by the process (e.g., the process has not yet summarized the bucket 30, and the process has not yet encountered as summary for the bucket 30 that is locked or a summary complete flag indicating that the bucket 30 is completely summarized). Continuing with the above example, and referring to FIGS. 1A-1D, if a first process 10a is assigned to summarize the first, second, and third buckets 30a, 30b and 30c, for example, the first process 10a may identify the first bucket 30a in a first iteration (on a first pass through block 352), identify the second bucket 30b in a second iteration (on a second pass through block 352), and identify the third bucket 30c in a third iteration (on a second pass through block 352).

Method 300 may include determining whether a summary directory for the summary to write to exists and is locked (block 354). In some embodiments, determining whether a summary directory for the summary to write to exists and is locked can include the process determining whether a bucket summary file 20 corresponding to the identified bucket 30 to be summarized exists and is already locked (e.g., by another summary process). Continuing with the above example, and referring to FIGS. 1A-1D, if a first process 10a is tasked with generating a report summaries having a summary ID of "1", and the first bucket 30a is identified to be summarized, the first process 10a may determine whether a first bucket summary file 20a (having a bucket ID 152 of 1 and a summary ID 150 of 1) exists and is locked (e.g., by another summary process 10). If the file does not exist or no other summary process 10 is currently writing to the first summary 20a, it may be determined that the file 20a is not locked. Conversely, if the file does exist and another summary process 10 is currently writing to the first summary 20a, it may be determined that the file 20a is locked. If it is determined that the summary directory for the summary to write to is locked (block 354), the method 250 may include proceeding to determining whether an additional bucket needs to be summarized (block 362) (described in more detail below).

If it is determined that the summary directory for the summary to write to is unlocked (block 354), the method 250 may include proceeding to generating the summary for the bucket, including locking the summary directory (block 356), writing the summary for the bucket to the summary directory (block 358), and unlocking the summary directory (block 360). If a summary does not exist, the process can also include creating the summary directory. In some embodiments, locking the summary directory can include the process locking the summary file 20 to prevent or otherwise inhibit other processes from writing and/or reading the summary file 20. For example, the first process 10a may lock the first summary file 20a so that other processes 10 are inhibited from writing and/or reading the first summary file 20a. In some embodiments, writing the summary for the bucket to the summary directory (block 358) can include the process 10 writing summary data 154 to the summary file 20. For example, continuing with the above example relating to the report summary for the size of e-mails processed by the e-mail server, the first process 10a may assess the events in the first bucket 30a, determine that there are 1000 events that include a "size" field and a sum of the values for the fields in those events is 1000 MB, and write to the summary file 20a summary data 154 that include a corresponding count and sum (e.g., count=1000; sum=1000 MB).

In some embodiments, writing the summary data for a bucket can include writing an indication of whether all of the contents of the bucket 30 have been summarized and/or an indication of what contents of the bucket 30 have been summarized. For example, if writing to the bucket 30a has been completed (the bucket 30a is a warm bucket) and the first process 10a is able to summarize all of the contents of the bucket 30a and determine that writing of data to the bucket 30a is complete, then the first process 10a may write a bucket summary complete indicator (e.g., set a summary complete flag) in the summary data 154 of the summary 20a. Thus, for example, a process 10 that subsequently attempts to summarize the bucket 30a may determine that the summary for the bucket 30a is complete and may move onto summarizing another bucket 30. As a further example, if writing to the bucket 30a has not yet been completed (the bucket 30a is a hot bucket) and the first process 10a is able to summarize the current contents of the bucket 30a (e.g., about 3,000 events currently stored in the bucket 30a) and determine that writing of data to the bucket 30a is not complete, then the first process 10a may write, in the summary data 154 of the summary 20a, a bucket summary incomplete indicator (e.g., set a summary incomplete flag) and/or summary location (e.g., a location of 3,000 indicating that the current summary 20a for the bucket 30a only summarized the first 3,000 events in the bucket 30a). Thus, for example, a process 10 that subsequently attempts to summarize the bucket 30a may determine that the at least a portion of the summary 20a for the bucket 30a has already been completed, process the un-summarized portion of the bucket 30a (e.g., the events after the first 3,000 events in the bucket 30a) and update the summary 20a accordingly. Thus, a process 10 may not have to re-summarize the data in bucket 30 that has already been summarized by another process 10.

In some embodiments, unlocking the summary directory can include the process 10 unlocking the summary file 20 to enable other processes 10 to write and/or read the summary file 20. For example, the first process 10a may unlock the first summary file 20a (e.g., now including the summary data 154 written by the first process 10a) so that other processes 10 are allowed to write to and/or read from the first summary file 20a.

In some embodiments, determining whether an additional bucket needs to be summarized can include the process determining whether any of the one or more of the buckets 30 the process is assigned to summarize has not yet been addressed by the process (e.g., the process has not yet summarized the bucket 30 and the process 10 has not yet encountered a locked summary for the bucket 30 or a summary complete flag indicating that the bucket 30 is completely summarized). Continuing with the above example, and referring to FIGS. 1A-1D, if the first process 10a is assigned to summarize the first, second, and third buckets 30a, 30b and 30c, for example, and the first process 10a has just completed summarizing the first bucket 30a and just encountered a locked summary file for 20b for the second bucket 30b, the process 10a may determine that at least the summary of the third bucket 30c may need to be completed (e.g., the process 10a has not yet summarized the bucket 30c and the process 10a has not yet encountered a locked summary file 20 for the bucket 30 or a summary complete flag indicating that the bucket 30 is completely summarized). As a result, the method may proceed to identifying the bucket to be summarized (e.g., the third bucket 30c) (block 352). As a further example, if the first process 10a is assigned to summarize the first, second, and third buckets 30a, 30b and 30c, for example, and the first process 10a has just completed summarizing the first and third buckets 30a and 30c and encountered a locked summary file for 20b for the second bucket 30b, the process 10a may determine that no additional bucket 30 needs to be summarized by the process. As a result, the method may complete or otherwise terminate as indicated by the "stop" block.

Accordingly, provided in some embodiments are systems and methods for concurrent summarization of indexed data. In some embodiments, two or more summary processes can be executed concurrently (e.g., in parallel) by an indexer 116 to generate summaries for respective subsets of indexed data (e.g., partitions or buckets of indexed data) managed by the indexer 116. In some embodiments, the summaries (e.g., report summaries and/or data model summaries) can be used to accelerate certain processes executed by the system 102, such as report acceleration and data model acceleration. Such a search system can employ, for example, a late-binding schema to identify one or more event records of a set of indexed event records that each include a portion of raw-machine-generated data and are each time-stamped or otherwise associated with a particular time. At least the following sections describe an example data system that may employ the described embodiments, including employing one or more searches of machine-generated data that can be employed in conjunction with the above described techniques.

Figure 4:
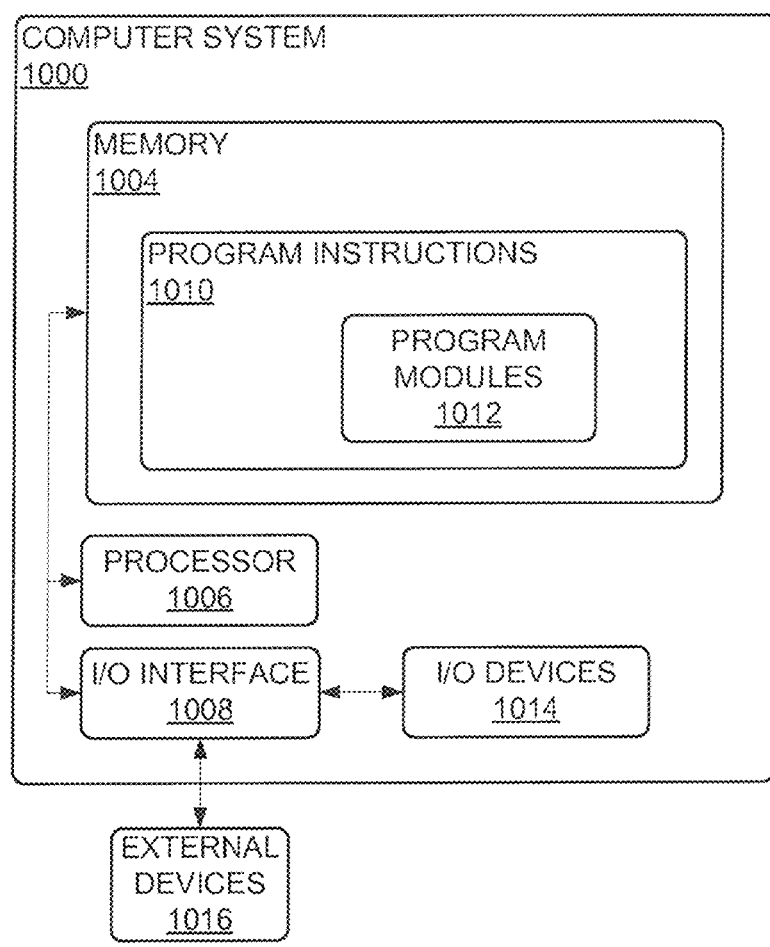
FIG. 4 is a diagram that illustrates an example computer system in accordance with one or more embodiments.

FIG. 4 is a diagram that illustrates an example computer system 1000 in accordance with one or more embodiments. In some embodiments, the computer system 1000 may include a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010 stored therein. The program instructions 1010 may include program modules 1012 that are executable by a computer processor (e.g., the processor 1006) to cause the functional operations described herein, including, for example, one or more of the methods 300 and/or 350. In the context of a computer system of the client device 106, the program modules 1012 may include one or more modules for performing some or all of the operations described with regard to the client device 106. In the context of a computer system of the application server 110, the program modules 1012 may include a one or more modules for performing some or all of the operations described with regard to the application server 110. In the context of other components of the search system 102 (e.g., data sources 112, forwarder 114, indexers 116, and/or the like), the program modules 1012 may include a one or more modules for performing some or all of the operations described with regard to the respective components.

The processor 1006 may be any suitable processor capable of executing/performing program instructions. The processor 1006 may include a central processing unit (CPU) that carries out program instructions (e.g., the program instructions of the program module(s) 1012) to perform the arithmetical, logical, and input/output operations described herein. The processor 1006 may include one or more processors. The I/O interface 1008 may provide an interface for communication with one or more I/O devices 1014, such as a joystick, a computer mouse, a keyboard, a display screen (e.g., an electronic display for displaying a graphical user interface (GUI)), and/or the like. The I/O devices 1014 may include one or more of the user input devices. The I/O devices 1014 may be connected to the I/O interface 1008 via a wired or a wireless connection. The I/O interface 1008 may provide an interface for communication with one or more external devices 1016, such as other computers, networks, and/or the like. In some embodiments, the I/O interface 1008 may include an antenna, transceiver, and/or the like.

1.1 Overview of Example Performance Data System

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that can include different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements, and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the time-stamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a time-stamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

Figure 5:
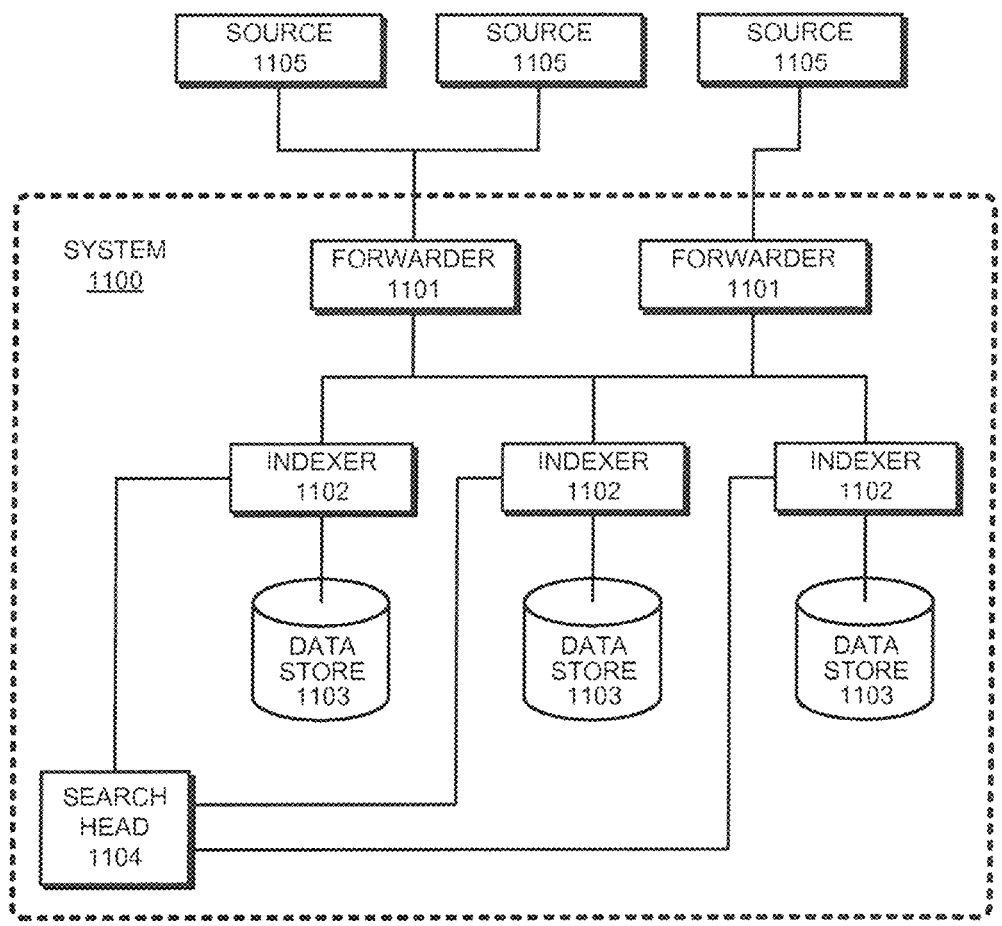
FIG. 5 presents a block diagram of an example event-processing system in accordance with the disclosed embodiments.

FIG. 5 presents a block diagram of an exemplary event-processing system 1100, similar to the SPLUNK® ENTERPRISE system. System 1100 includes one or more forwarders 1101 that collect data obtained from a variety of different data sources 1105, and one or more indexers 1102 that store, process, and/or perform operations on this data, wherein each indexer operates on data contained in a specific data store 1103. These forwarders and indexers can comprise separate computer systems in a data center, or may alternatively comprise separate processes executing on various computer systems in a data center.

During operation, the forwarders 1101 identify which indexers 1102 will receive the collected data and then forward the data to the identified indexers. Forwarders 1101 can also perform operations to strip out extraneous data and detect timestamps in the data. The forwarders 1101 next determine which indexers 1102 will receive each data item and then forward the data items to the determined indexers 1102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 1100 and the processes described below with respect to FIGS. 5-9 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 6:
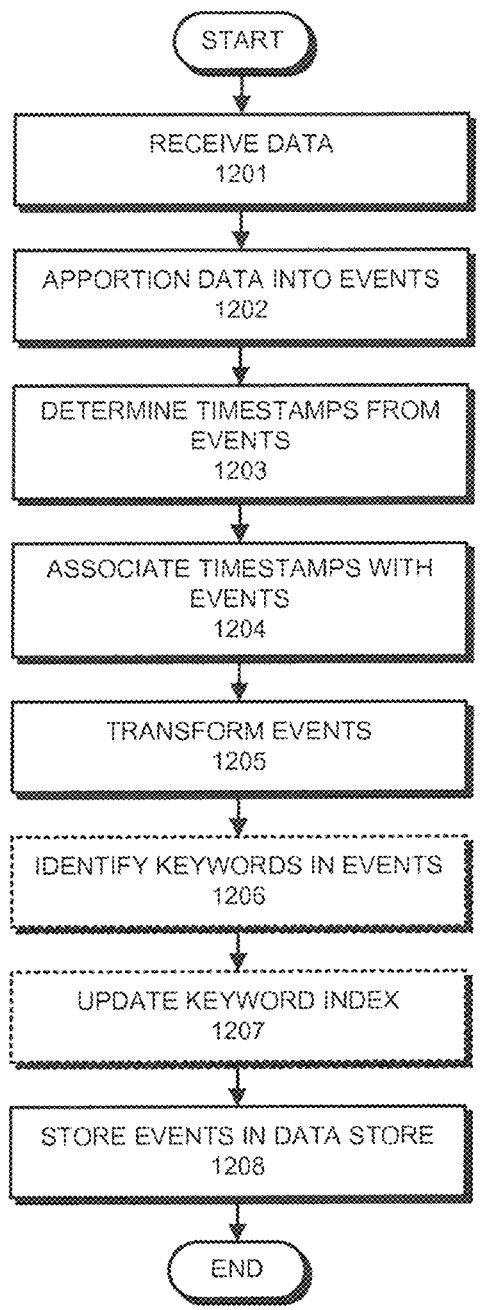
FIG. 6 presents a flowchart illustrating an example of how indexers process, index, and store data received from forwarders in accordance with the disclosed embodiments.

FIG. 6 presents a flowchart illustrating how an indexer processes, indexes, and stores data received from forwarders in accordance with the disclosed embodiments. At block 1201, the indexer receives the data from the forwarder. Next, at block 1202, the indexer apportions the data into events. Note that the data can include lines of text that are separated by carriage returns or line breaks, and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces, or line breaks. In some cases, a user can fine-tune or configure the rules that the indexers use to determine event boundaries in order to adapt the rules to the user's specific requirements.

Next, the indexer determines a timestamp for each event at block 1203. As mentioned above, these timestamps can be determined by extracting the time directly from the data in the event, or by interpolating the time based on timestamps from temporally proximate events. In some cases, a timestamp can be determined based on the time the data was received or generated. The indexer subsequently associates the determined timestamp with each event at block 1204, for example, by storing the timestamp as metadata for each event.

Then, the system can apply transformations to data to be included in events at block 1205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in events in block 1206. Then, at block 1207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or a colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 1208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 1102 is responsible for storing and searching a subset of the events contained in a corresponding data store 1103. By distributing events among the indexers and data stores, the indexers can analyze events for a query in parallel, for example, using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in. U.S. patent application Ser. No. 14/266,812 filed on Apr. 30 2014, and in U.S. application patent Ser. No. 14/266,817 also filed on Apr. 30, 2014, which are hereby incorporated by reference.

1.4 Query Processing

Figure 7:
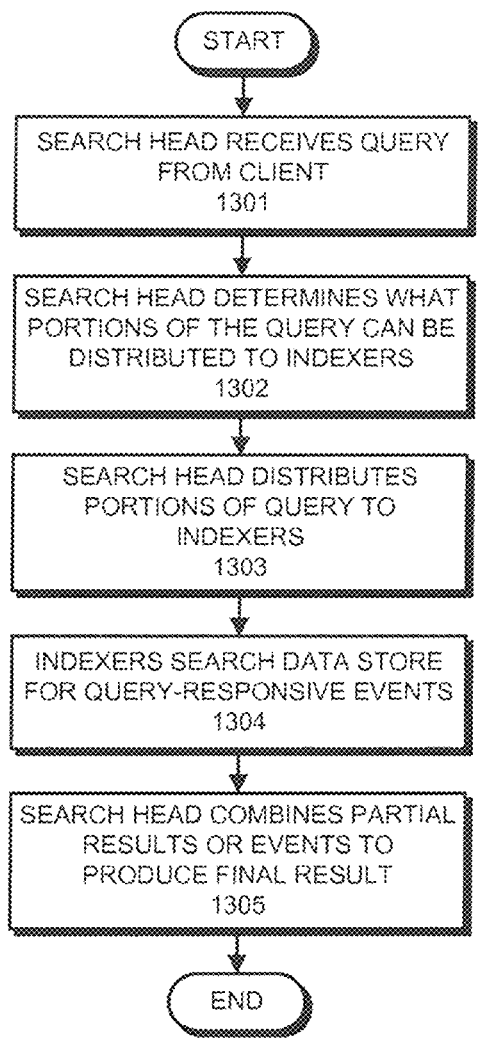
FIG. 7 presents a flowchart illustrating an example of how a search head and indexers perform a search query in accordance with the disclosed embodiments.

FIG. 7 presents a flowchart illustrating how a search head and indexers perform a search query in accordance with the disclosed embodiments. At the start of this process, a search head receives a search query from a client at block 1301. Next, at block 1302, the search head analyzes the search query to determine what portions can be delegated to indexers and what portions need to be executed locally by the search head. At block 1303, the search head distributes the determined portions of the query to the indexers. Note that commands that operate on single events can be trivially delegated to the indexers, while commands that involve events from multiple indexers are harder to delegate.

Then, at block 1304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 1304 may involve using the late-binding scheme to extract values for specified fields from events at the time the query is processed. Next, the indexers can either send the relevant events back to the search head, or use the events to calculate a partial result, and send the partial result back to the search head.

Finally, at block 1305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by the system 1100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these settings to query the indexers to obtain a superset of the eventual results. Then, during a filtering stage, the search head can perform field-extraction operations on the superset to produce a reduced set of search results.

1.5 Field Extraction

Figure 8:
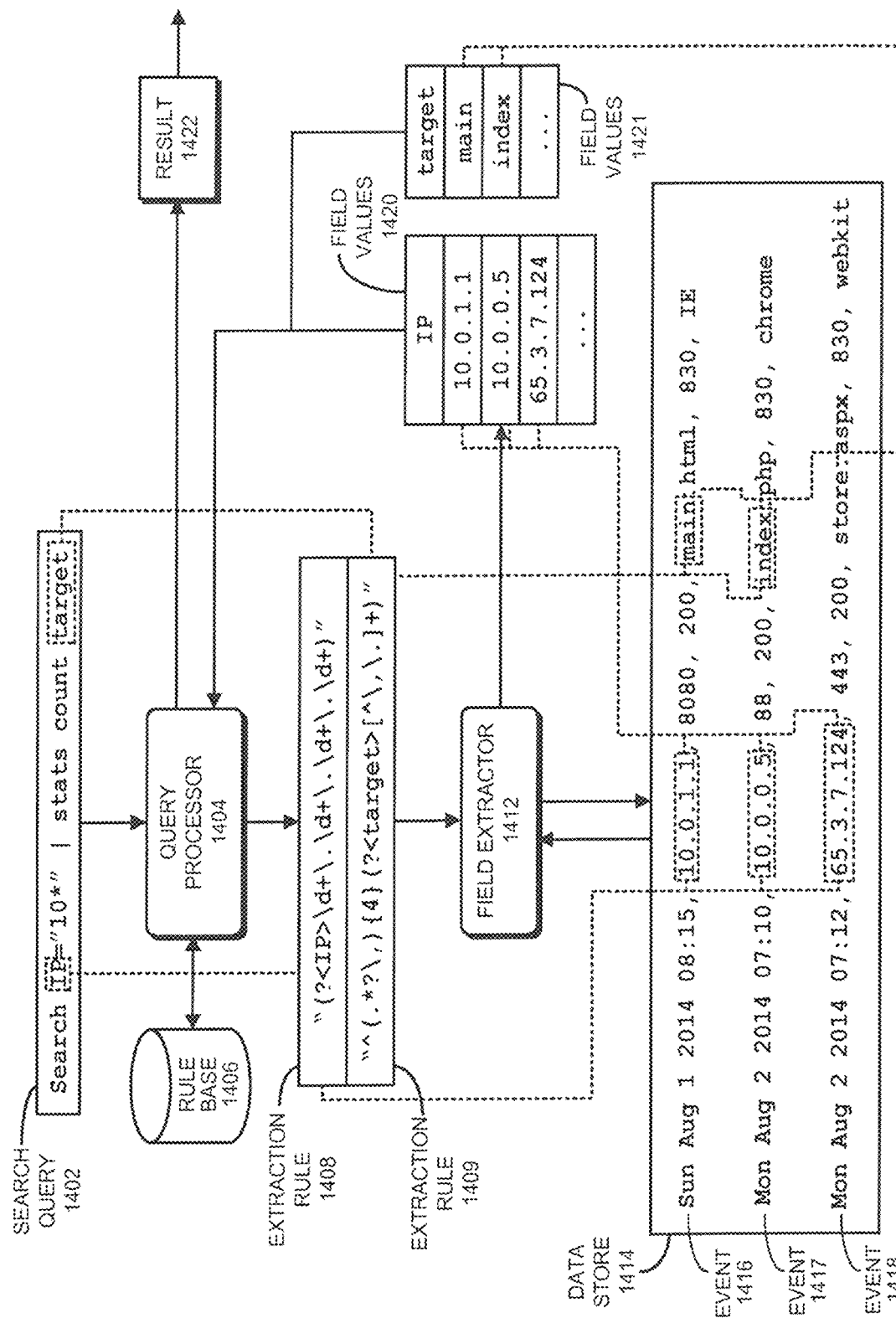
FIG. 8 presents a block diagram of an example system for processing search requests that uses extraction rules for field values in accordance with the disclosed embodiments.

FIG. 8 presents a block diagram illustrating how fields can be extracted during query processing in accordance with the disclosed embodiments. At the start of this process, a search query 1402 is received at a query processor 1404. Query processor 1404 includes various mechanisms for processing a query, wherein these mechanisms can reside in a search head 1104 and/or an indexer 1102. Note that the exemplary search query 1402 illustrated in FIG. 8 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 1402 can also be expressed in other query languages, such as the Structured Query Language (SQL) or any suitable query language.

Upon receiving search query 1402, query processor 1404 sees that search query 1402 includes two fields "IP" and "target." Query processor 1404 also determines that the values for the "IP" and "target" fields have not already been extracted from events in data store 1414, and consequently determines that query processor 1404 needs to use extraction rules to extract values for the fields. Hence, query processor 1404 performs a lookup for the extraction rules in a rule base 1406, wherein the rule base 1406 maps field names to corresponding extraction rules and obtains extraction rules 1408-1409, wherein extraction rule 1408 specifies how to extract a value for the "IP" field from an event, and extraction rule 1409 specifies how to extract a value for the "target" field from an event. As is illustrated in FIG. 8, extraction rules 1408-1409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or a value retrieved by the extraction rule. For example, a transformation rule may truncate a character string, or convert the character string into a different data format. In some cases, the query itself can specify one or more extraction rules.

Next, query processor 1404 sends extraction rules 1408-1409 to a field extractor 1412, which applies extraction rules 1408-1409 to events 1416-1418 in a data store 1414. Note that data store 1414 can include one or more data stores, and extraction rules 1408-1409 can be applied to large numbers of events in data store 1414, and are not meant to be limited to the three events 1416-1418 illustrated in FIG. 8. Moreover, the query processor 1404 can instruct field extractor 1412 to apply the extraction rules to all of the events in a data store 1414, or to a subset of the events that have been filtered based on some criteria.

Next field extractor 1412 applies extraction rule 1408 for the first command "Search IP="10*"" to events in data store 1414 including events 1416-1418. Extraction rule 1408 is used to extract values for the IP address field from events in data store 1414 by looking for a pattern of one or more digits, followed by a period, followed again by one or more digits, followed by another period, followed again by one or more digits, followed by another period, and followed again by one or more digits. Next, field extractor 1412 returns field values 1420 to query processor 1404, which uses the criterion IP="10*" to look for IP addresses that start with "10". Note that events 1416 and 1417 match this criterion, but event 1418 does not, so the result set for the first command is events 1416-1417.

Query processor 1404 then sends events 1416-1417 to the next command "stats count target." To process this command, query processor 1404 causes field extractor 1412 to apply extraction rule 1409 to events 1416-1417. Extraction rule 1409 is used to extract values for the target field for events 1416-1417 by skipping the first four commas in events 1416-1417, and then extracting all of the following characters until a comma or period is reached. Next, field extractor 1412 returns field values 1421 to query processor 1404, which executes the command "stats count target" to count the number of unique values contained in the target fields, which in this example produces the value "2" that is returned as a final result 1422 for the query.

Note that the query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or a chart, generated from the values.

1.6 Exemplary Search Screen

Figure 10A:
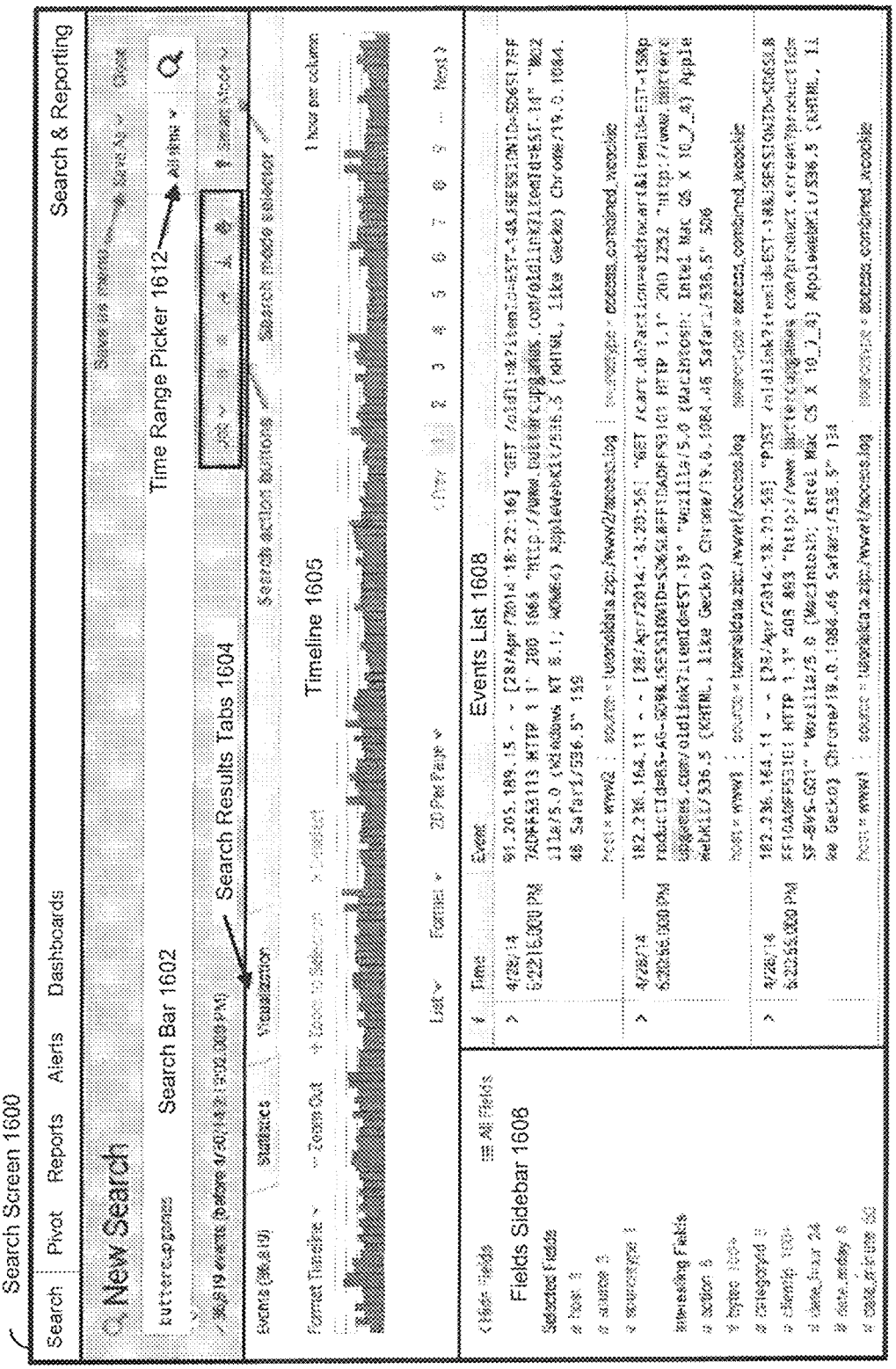
FIG. 10A illustrates an example search screen in accordance with the disclosed embodiments.
Figure 10B:
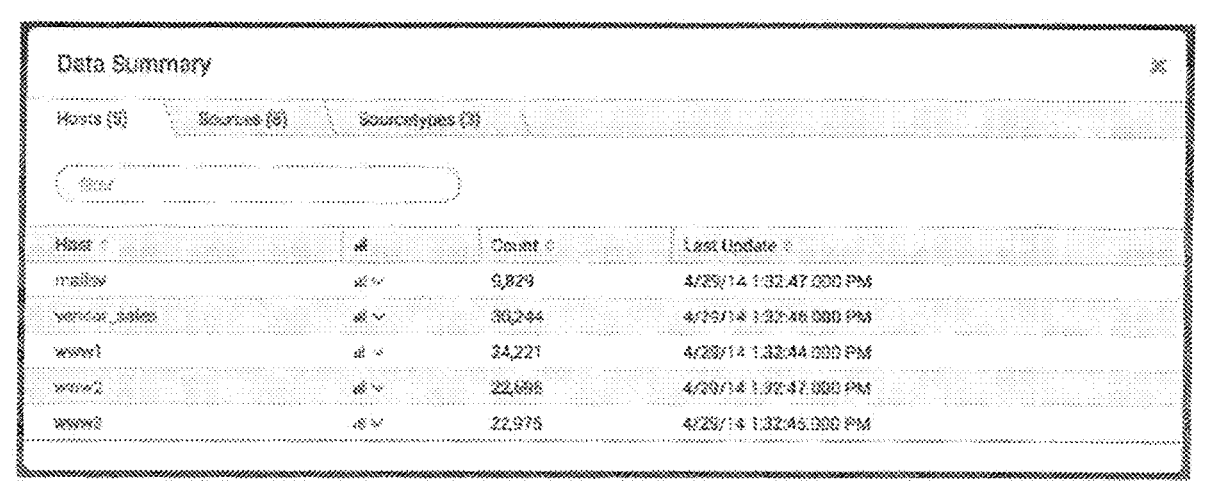

FIG. 10A illustrates an exemplary search screen 1600 in accordance with the disclosed embodiments. Search screen 1600 includes a search bar 1602 that accepts user input in the form of a search string. It also includes a time range picker 1612 that enables the user to specify a time range for the search. For "historical searches," the user can select a specific time range, or alternatively a relative time range, such as "today," "yesterday," or "last week." For "real-time searches," the user can select the size of a preceding time window to search for real-time events. Search screen 1600 also initially displays a "data summary" dialog as is illustrated in FIG. 10B that enables the user to select different sources for the event data, for example, by selecting specific hosts and log files.

After the search is executed, the search screen 1600 can display the results through search results tabs 1604, wherein search results tabs 1604 include: an "events tab" that displays various information about events returned by the search; a "statistics tab" that displays statistics about the search results; and a "visualization tab" that displays various visualizations of the search results. The events tab illustrated in FIG. 10A displays a timeline graph 1605 that graphically illustrates the number of events that occurred in one-hour intervals over the selected time range. It also displays an events list 1608 that enables a user to view the raw data in each of the returned events. It additionally displays a fields sidebar 1606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 9 illustrates how a search query 1501 received from a client at search head 1104 can split into two phases, including: (1) a "map phase" comprising subtasks 1502 (e.g., data retrieval or simple filtering) that may be performed in parallel and are "mapped" to indexers 1102 for execution, and (2) a "reduce phase" comprising a merging operation 1503 to be executed by the search head when the results are ultimately collected from the indexers.

During operation, upon receiving search query 1501, search head 1104 modifies search query 1501 by substituting "stats" with "prestats" to produce search query 1502, and then distributes search query 1502 to one or more distributed indexers, which are also referred to as "search peers". Note that search queues may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 5, or may alternatively distribute a modified version (e.g., a more restricted version) of the search query to the search peers. In this example, the indexers are responsible for producing the results and sending them to the search head. After the indexers return the results to the search head, the search head performs the merging operations 1503 on the results. Note that by executing the computation in this way, the system effectively distributes the computational operations while minimizing data transfers.

1.7.2 Keyword Index

As described above with reference to the flowcharts in FIGS. 6 and 7, the event-processing system 1100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of the system 1100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for & specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014, which is hereby incorporated by reference.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether the generation of updated reports can be accelerated by creating intermediate summaries. (This is possible if results from preceding time periods can be computed separately and combined to generate an updated report. In some cases, it is not possible to combine such incremental results, for example, where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that matches the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011, which are hereby incorporated by reference.

1.8 Security Features

The SPLUNK® ENTERPRISE platform provides various schemas, dashboards, and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volumes, uniform resource locator strings, and source addresses. The process of detecting security threats for network-related information is further described in U.S. patent application Ser. Nos. 13/956,252, and 13/956,262, which are hereby incorporated by reference. Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 11A:
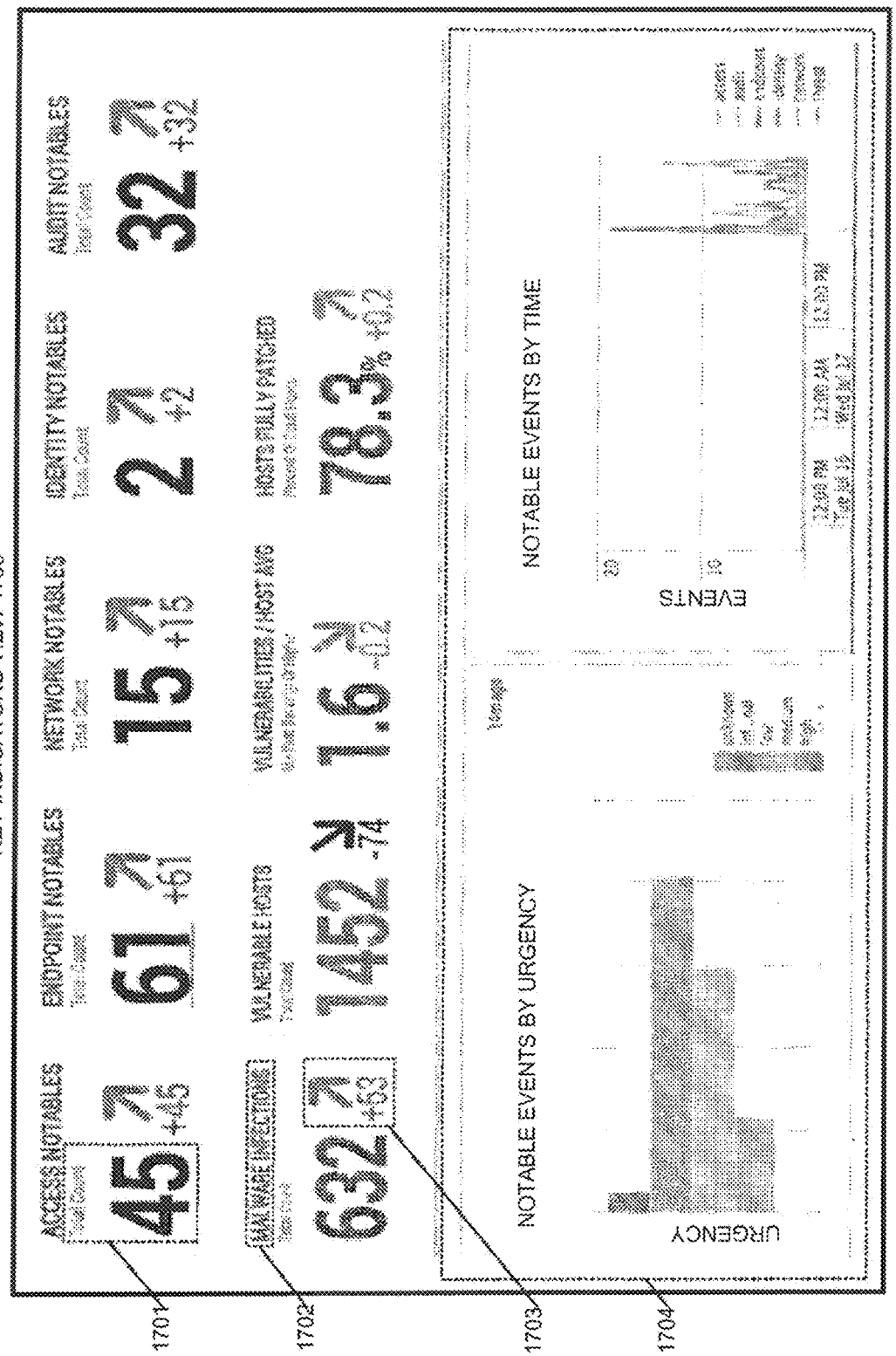
FIG. 11A illustrates an example key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 11A illustrates an exemplary key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338 filed Jul. 31,2013, which is hereby incorporated by reference.

Figure 11B:
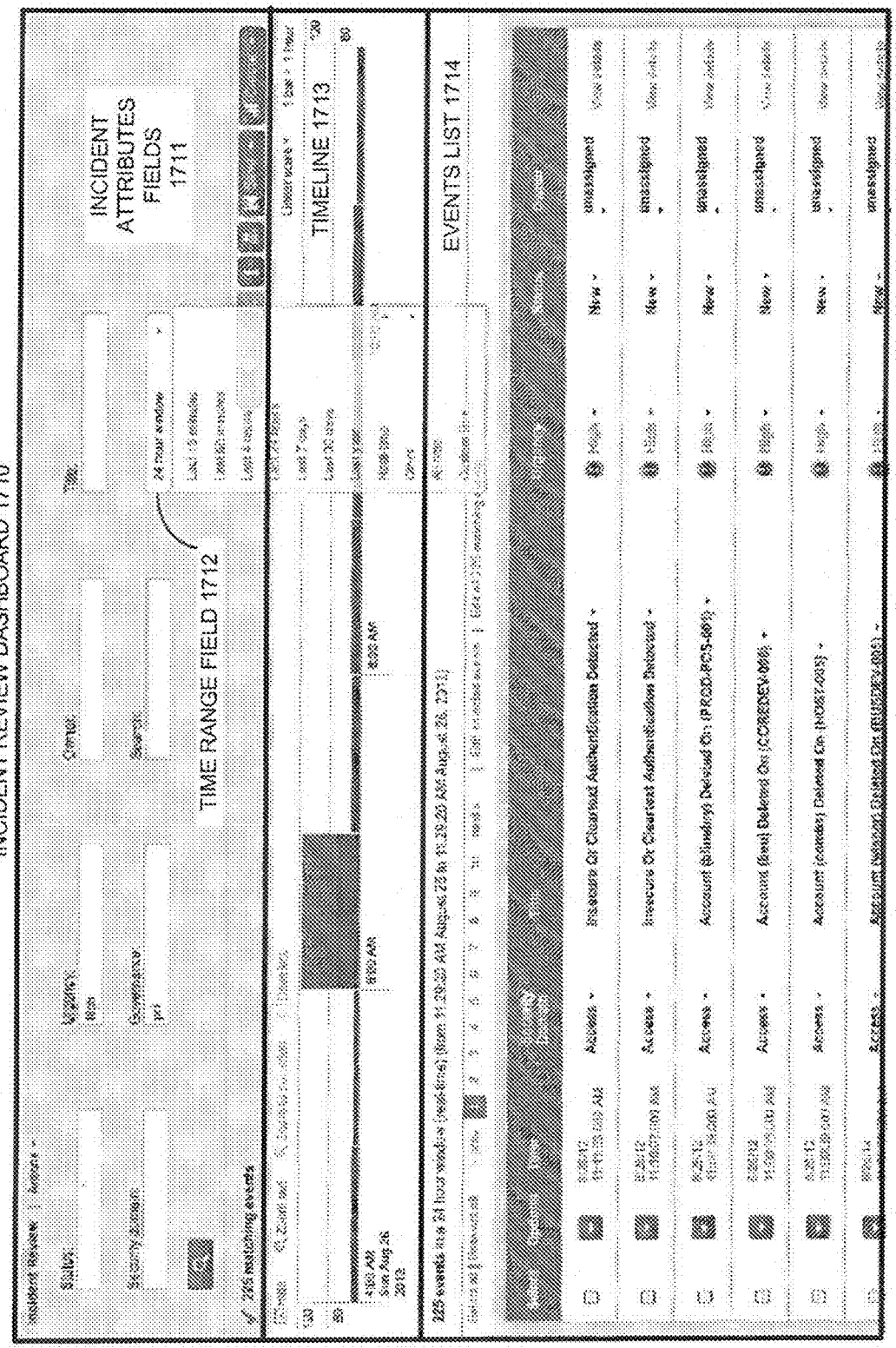
FIG. 11B illustrates an example incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 11B illustrates an exemplary incident review dashboard 1710 that includes a set of incident attribute fields 1711 that, for example, enables a user to specify a time range field 1712 for the displayed events. It also includes a timeline 1713 that graphically illustrates the number of incidents that occurred in one-hour time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example, by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. Pat. No. 14/167,316 filed Jan. 29, 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 11C:
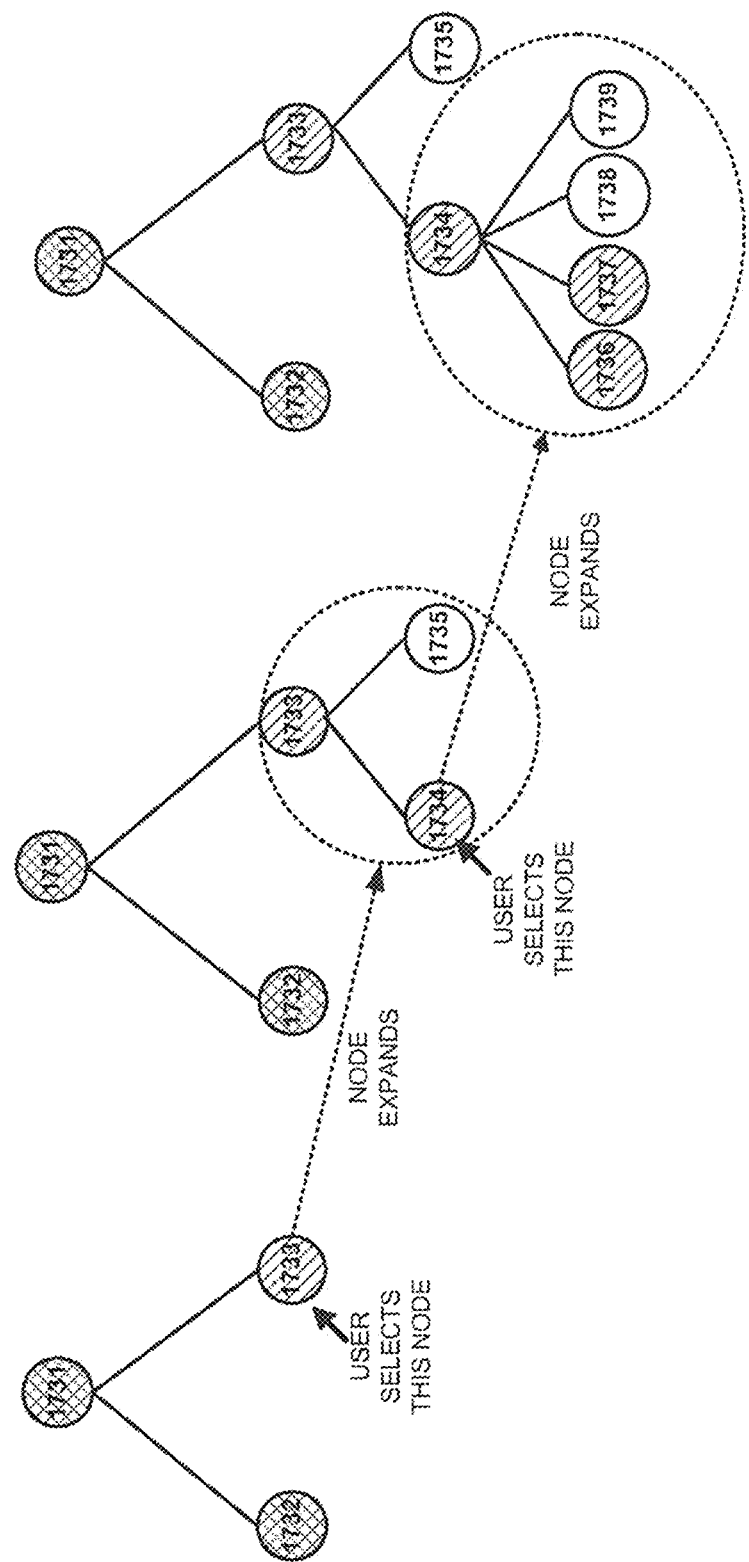
FIG. 11C illustrates an example proactive monitoring tree in accordance with the disclosed embodiments.
Figure 11D:
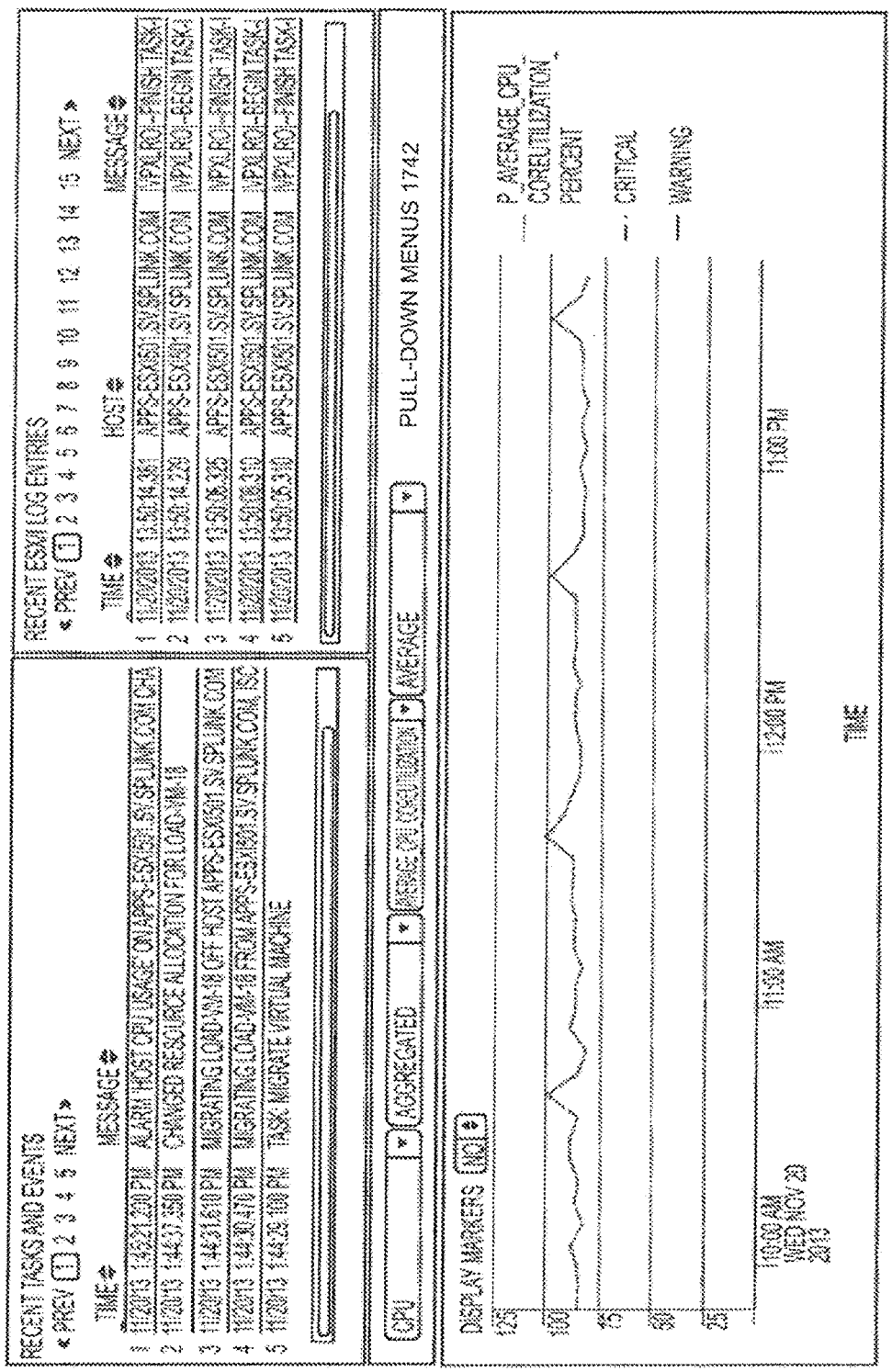
FIG. 11D illustrates an example screen displaying both log data and performance data in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 11C, wherein nodes 1733 and 1734 are selectively expanded. Note that nodes 1731-1739 can be displayed using different patterns or colors to represent different performance states, such as a critical state, a warning state, a normal state, or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on Apr. 15, 2014, which is hereby incorporated by reference.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 11D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data quickly determine the root cause of a performance problem. This user interface is described in more detail in U.S. patent application Ser. No. 14/167,316 filed on Jan. 29, 2014, which is hereby incorporated by reference.

Further modifications and embodiments of various aspects of the disclosure will be apparent to those skilled in the art in view of this description. Accordingly, this description is to be construed as illustrative only and is for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

It will be appreciated that the methods described are example embodiments of methods that may be employed in accordance with the techniques described herein. The methods may be modified to facilitate variations of their implementation and use. The order of the methods and the operations provided therein may be changed, and various elements may be added, reordered, combined, omitted, modified, etc. Portions of the methods may be implemented in software, hardware, or a combination thereof. Some or all of the portions of the methods may be implemented by one or more of the processors/modules/applications described herein.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A method of executing a scheduled summary request, said method comprising:
   receiving raw machine-generated data;
   segmenting the raw machine-generated data into a set of time-stamped event records;
   indexing and storing the set of time-stamped event records in two or more partitions of event records;
   scheduling a summary request for a first partition of the two or more partitions, wherein said summary request is scheduled based on a processing load requirement comprising a process delay of a parallel process;
   sending the summary request to a plurality of indexers when the processing load requirement has been met;
   using the indexers, identifying a first bucket for serving the summary request;
   locking a first summary directory associated with the first bucket;
   writing first summary data for the first bucket to the first summary directory, wherein the first summary data comprises an indication that an entirety of contents of the first partition is summarized and a summary of data in the first partition;
   unlocking the first summary directory; and
   responsive to the entirety of contents of the first partition being summarized, writing second summary data for a second bucket to a second summary directory.

2. The method as described in claim 1, wherein the two or more partitions are stored in a memory of an indexer.

3. The method as described in claim 2, further comprising receiving the summary request at the indexer from one or more search heads.

4. The method as described in claim 1, wherein each of the two or more partitions is associated with a timespan and comprises time-stamped event records having a respective timestamp corresponding to a respective time in the timespan.

5. The method as described in claim 1, wherein said processing load requirement further comprises a number of processes being executed, and further comprising determining that less than the number of processes are currently being executed, and wherein the summary request is generated responsive to the determining that less than the given number of processes are currently being executed.

6. The method of claim 1, wherein said processing load requirement further comprises a processing delay requirement, and further comprising determining that at least an amount of time corresponding to the processing delay requirement has passed since initiating execution of a prior summary request, wherein the summary request is generated responsive to the determining that at least the amount of time has passed since initiating execution of the prior summary request.

7. The method of claim 1, further comprising:
   receiving, from an entity, a request for the second summary data; and
   providing, to the entity, the second summary data for the second bucket responsive to the request, wherein the entity is configured to generate a result based at least in part on contents of the second summary data for the second bucket.

8. The method of claim 1, wherein the second summary data comprises a first subset of values of fields of events corresponding to a data model, and further comprising:
   receiving, from an entity, a request for summary data; and
   providing, to the entity, the summary for the bucket responsive to the request for summary data, wherein the entity is configured to generate a set of values fields of events for the data model determined based at least in part on the first subset of values of fields.

9. The method of claim 8, wherein the summary request is scheduled responsive to enabling acceleration of the data model.

10. The method of claim 1, wherein the summary request is scheduled responsive to enabling acceleration of a report.

11. The method of claim 1, further comprising:
    receiving a search request;
    generating search results based at least in part on the summary for the first bucket; and
    providing the search results in response to the search request.

12. The method as described in claim 1, further comprising determining that a second summary directory is locked to inhibit a process from writing summary data to the second summary directory.

13. The method as described in claim 1, further comprising determining that the second summary directory comprises an indication that an entirety of contents of the second partition is summarized.

14. The method as described in claim 1, further comprising determining that the summary directory comprises an indication that less than an entirety of contents of the second partition is summarized.

15. A system comprising:
    one or more processors; and
    one or more memories comprising program instructions stored thereon that are executable by the one or more processors to cause the system to perform a method comprising:

receiving raw machine-generated data;

segmenting the raw machine-generated data into a set of time-stamped event records;

indexing and storing the set of time-stamped event records in two or more partitions of event records;

scheduling a summary request for a first partition of the two or more partitions, wherein said summary request is scheduled based on a processing load requirement comprising a process delay of a parallel process;

sending the summary request to a plurality of indexers when the processing load requirement has been met;

using the indexers, identifying a first bucket for serving the summary request;

locking a first summary directory associated with the first bucket;

writing first summary data for the first bucket to the first summary directory, wherein the first summary data comprises an indication that an entirety of contents of the first partition is summarized and a summary of data in the first partition;

unlocking the first summary directory; and responsive to the entirety of contents of the first partition being summarized, writing second summary data for a second bucket to a second summary directory.

16. The system as described in claim 15, wherein the two or more partitions are stored in a memory of an indexer.

17. The system as described in claim 16, wherein the method further comprises receiving the summary request at the indexer from one or more search heads.

18. The system as described in claim 15, wherein each of the two or more partitions is associated with a timespan and comprises time-stamped event records having a respective timestamp corresponding to a respective time in the timespan.

19. The system as described in claim 15, wherein said processing load requirement comprises a number of processes being executed, and wherein the method further comprises determining that less than the number of processes are currently being executed, and wherein the summary request is generated responsive to the determining that less than the given number of processes are currently being executed.

20. The system of claim 15, wherein said processing load requirement comprises a processing delay requirement, and wherein the method further comprises determining that at least an amount of time corresponding to the processing delay requirement has passed since initiating execution of a prior summary request, wherein the summary request is generated responsive to the determining that at least the amount of time has passed since initiating execution of the prior summary request.

21. The system of claim 15, wherein the method further comprises:

receiving, from an entity, a request for summary data; and providing, to the entity, the first summary data responsive to the request, wherein the entity is configured to generate a result based at least in part on the contents of the first summary data.

22. The system of claim 15, wherein the first summary comprises a first subset of values of fields of events corresponding to a data model, and wherein the method further comprises:

receiving, from an entity, a request for summary data; and providing, to the entity, the first summary data for the first bucket responsive to the request, wherein the entity is configured to generate a set of values fields of events for the data model determined based at least in part on the first subset of values of fields.

23. The system of claim 22, wherein the summary request is scheduled responsive to enabling acceleration of the data model.

24. The system of claim 15, wherein the summary request is scheduled responsive to enabling acceleration of a report.

25. The system of claim 15, wherein the method further comprises:

receiving a search request;

generating search results based at least in part on the first summary data for the first bucket; and providing the search results in response to the search request.

26. The system as described in claim 15, wherein the method further comprises determining that the second summary directory is locked to inhibit a process from writing the second summary data to the second summary directory.

27. The system as described in claim 15, wherein the method further comprises determining that the second summary directory comprises an indication that an entirety of contents of a second partition is summarized.

28. One or more non-transitory computer-readable medium comprising program instructions stored thereon that are executable by one or more processors to implement a method comprising:

receiving raw machine-generated data;

segmenting the raw machine-generated data into a set of time-stamped event records;

indexing and storing the set of time-stamped event records in two or more partitions of event records;

scheduling a summary request for a first partition of the two or more partitions, wherein said summary request is scheduled based on a processing load requirement comprising a process delay of a parallel process;

sending the summary request to a plurality of indexers when the processing load requirement has been met;

using the indexers, identifying a first bucket for serving the summary request;

locking a first summary directory associated with the first bucket;

writing first summary data for the first bucket to the summary directory, wherein the first summary data comprises an indication that an entirety of contents of the first partition is summarized and a summary of data in the first partition;

unlocking the first summary directory; and responsive to the entirety of contents of the first partition being summarized, writing second summary data for a second bucket to a second summary directory.

\* \* \* \* \*